(12) United States Patent
Piramuthu et al.

(10) Patent No.: US 11,636,524 B2
(45) Date of Patent: Apr. 25, 2023

(54) COMPUTER VISION, USER SEGMENT, AND MISSING ITEM DETERMINATION

(71) Applicant: eBay Inc., San Jose, CA (US)

(72) Inventors: Robinson Piramuthu, Oakland, CA (US); Timothy Samuel Keefer, San Jose, CA (US); Ashmeet Singh Rekhi, Campbell, CA (US); Padmapriya Gudipati, San Jose, CA (US); Mohammadhadi Kiapour, San Francisco, CA (US); Shuai Zheng, Berkeley, CA (US); Md Atiq ul Islam, San Jose, CA (US); Nicholas Anthony Whyte, San Jose, CA (US); Giridharan Iyengar, San Jose, CA (US)

(73) Assignee: eBay Inc., San Jose, CA (US)

( * ) Notice: Subject to any disclaimer, the term of this patent is extended or adjusted under 35 U.S.C. 154(b) by 261 days.

(21) Appl. No.: 17/141,618

(22) Filed: Jan. 5, 2021

(65) Prior Publication Data
US 2021/0201378 A1    Jul. 1, 2021

Related U.S. Application Data

(63) Continuation of application No. 16/235,007, filed on Dec. 28, 2018, now Pat. No. 10,963,940.
(Continued)

(51) Int. Cl.
*G06Q 30/0601* (2023.01)
*G06V 20/20* (2022.01)
(Continued)

(52) U.S. Cl.
CPC ......... *G06Q 30/0627* (2013.01); *G06F 3/017* (2013.01); *G06F 16/532* (2019.01);
(Continued)

(58) Field of Classification Search
None
See application file for complete search history.

(56) References Cited

U.S. PATENT DOCUMENTS

| 7,089,226 B1 | 8/2006 | Dumais et al. |
| 7,801,885 B1 | 9/2010 | Verma |

(Continued)

FOREIGN PATENT DOCUMENTS

| AU | 2014274171 A1 | 1/2016 |
| EP | 3155577 A1 | 4/2017 |

(Continued)

OTHER PUBLICATIONS

Examiner's Answer to Appeal Brief received for U.S. Appl. No. 16/235,140, dated Oct. 26, 2021, 11 Pages.
(Continued)

*Primary Examiner* — Nancy Bitar
(74) *Attorney, Agent, or Firm* — FIG. 1 Patents

(57) ABSTRACT

Techniques and systems are described that leverage computer vision as part of search to expand functionality of a computing device available to a user and increase operational computational efficiency as well as efficiency in user interaction. In a first example, user interaction with items of digital content is monitored. Computer vision techniques are used to identify digital images in the digital content, objects within the digital images, and characteristics of those objects. This information is used to assign a user to a user segment of a user population which is then used to control output of subsequent digital content to the user, e.g., recommendations, digital marketing content, and so forth.

20 Claims, 15 Drawing Sheets

Related U.S. Application Data

(60) Provisional application No. 62/612,275, filed on Dec. 29, 2017.

(51) Int. Cl.

| | | |
|---|---|---|
| *G06F 3/01* | (2006.01) | |
| *G06F 3/0482* | (2013.01) | |
| *G06F 16/583* | (2019.01) | |
| *G06N 20/00* | (2019.01) | |
| *G06F 16/538* | (2019.01) | |
| *G06F 16/9535* | (2019.01) | |
| *G06F 16/532* | (2019.01) | |
| *G06F 3/04842* | (2022.01) | |
| *G06F 3/0488* | (2022.01) | |

(52) U.S. Cl.
CPC .......... *G06F 16/538* (2019.01); *G06F 16/583* (2019.01); *G06F 16/9535* (2019.01); *G06N 20/00* (2019.01); *G06Q 30/0643* (2013.01); *G06V 20/20* (2022.01); *G06F 3/0482* (2013.01); *G06F 3/0488* (2013.01); *G06F 3/04842* (2013.01); *G06Q 30/0621* (2013.01); *G06Q 30/0631* (2013.01)

(56) References Cited

U.S. PATENT DOCUMENTS

| | | | |
|---|---|---|---|
| 7,835,953 | B2 | 11/2010 | Chen et al. |
| 7,907,755 | B1 | 3/2011 | Perlmutter et al. |
| 8,374,920 | B2 | 2/2013 | Hedges et al. |
| 8,386,486 | B2 | 2/2013 | Zhang et al. |
| 8,478,744 | B1 | 7/2013 | Rose |
| 8,589,410 | B2 | 11/2013 | Sud et al. |
| 8,630,851 | B1 | 1/2014 | Hertschuh et al. |
| 8,832,096 | B1 | 9/2014 | Jing et al. |
| 8,908,962 | B2 | 12/2014 | Bhardwaj et al. |
| 9,015,139 | B2 | 4/2015 | Wong |
| 9,158,389 | B1 | 10/2015 | Sharma et al. |
| 9,171,092 | B2 * | 10/2015 | Kruglick ............... G06F 40/205 |
| 9,176,993 | B2 | 11/2015 | Grauman et al. |
| 9,269,011 | B1 | 2/2016 | Sikka et al. |
| 9,317,753 | B2 | 4/2016 | Saptharishi et al. |
| 9,420,319 | B1 | 8/2016 | Story et al. |
| 9,639,957 | B2 | 5/2017 | Yalniz et al. |
| 9,672,436 | B1 | 6/2017 | Dhua |
| 10,109,051 | B1 | 10/2018 | Natesh et al. |
| 10,380,734 | B2 | 8/2019 | Parikh et al. |
| 10,963,940 | B2 * | 3/2021 | Piramuthu ............. G06F 16/907 |
| 11,200,611 | B2 * | 12/2021 | Piramuthu .............. G06F 3/017 |
| 11,250,487 | B2 * | 2/2022 | Piramuthu ......... G06Q 30/0643 |
| 2002/0019819 | A1 | 2/2002 | Sekiguchi et al. |
| 2004/0243545 | A1 | 12/2004 | Boone et al. |
| 2005/0065773 | A1 | 3/2005 | Huang et al. |
| 2005/0086223 | A1 | 4/2005 | Rui |
| 2007/0067279 | A1 | 3/2007 | Bonabeau et al. |
| 2007/0266002 | A1 | 11/2007 | Chowdhury et al. |
| 2008/0152231 | A1 | 6/2008 | Gokturk et al. |
| 2008/0154856 | A1 | 6/2008 | Riise et al. |
| 2008/0177640 | A1 | 7/2008 | Gokturk et al. |
| 2009/0041340 | A1 | 2/2009 | Suzuki et al. |
| 2009/0074300 | A1 | 3/2009 | Hull et al. |
| 2009/0089246 | A1 | 4/2009 | Chi |
| 2009/0132388 | A1 | 5/2009 | Omori et al. |
| 2009/0282025 | A1 | 11/2009 | Winter et al. |
| 2010/0241528 | A1 | 9/2010 | Hedges et al. |
| 2011/0219025 | A1 | 9/2011 | Lipson et al. |
| 2012/0062732 | A1 * | 3/2012 | Marman ............ G08B 13/19682 348/142 |
| 2012/0095866 | A1 | 4/2012 | Caiazzi et al. |
| 2012/0127316 | A1 | 5/2012 | Kundu et al. |
| 2013/0121600 | A1 | 5/2013 | Lin |
| 2013/0223673 | A1 | 8/2013 | Davis et al. |
| 2013/0249934 | A1 | 9/2013 | Gershon et al. |
| 2013/0293580 | A1 * | 11/2013 | Spivack ............. G06Q 30/0623 345/633 |
| 2014/0040279 | A1 | 2/2014 | Beygelzimer et al. |
| 2014/0101134 | A1 | 4/2014 | Bohrer et al. |
| 2014/0258267 | A1 | 9/2014 | Lin et al. |
| 2014/0324836 | A1 | 10/2014 | Chittar et al. |
| 2015/0081656 | A1 | 3/2015 | Wang et al. |
| 2015/0248719 | A1 | 9/2015 | Hansen |
| 2015/0293942 | A1 | 10/2015 | Cady et al. |
| 2016/0109941 | A1 * | 4/2016 | Govindarajeswaran ..................... G06F 16/54 345/156 |
| 2016/0171773 | A1 | 6/2016 | Hara |
| 2016/0234568 | A1 | 8/2016 | Grusd |
| 2016/0292757 | A1 | 10/2016 | Bandara et al. |
| 2016/0320932 | A1 | 11/2016 | Belhumeur et al. |
| 2016/0321733 | A1 * | 11/2016 | Yonaha ............. G06Q 30/0627 |
| 2016/0364414 | A1 | 12/2016 | Petrou et al. |
| 2016/0378861 | A1 | 12/2016 | Eledath et al. |
| 2017/0097948 | A1 | 4/2017 | Kerr et al. |
| 2017/0124434 | A1 | 5/2017 | Goodwin et al. |
| 2017/0186032 | A1 | 6/2017 | Rangasamy Kannadasan et al. |
| 2017/0206465 | A1 | 7/2017 | Jin et al. |
| 2017/0243275 | A1 | 8/2017 | Goens et al. |
| 2017/0300905 | A1 | 10/2017 | Withrow et al. |
| 2018/0089542 | A1 | 3/2018 | Stoop et al. |
| 2018/0165798 | A1 * | 6/2018 | Lin ...................... G06V 10/764 |
| 2018/0260843 | A1 | 9/2018 | Hiranandani et al. |
| 2018/0276731 | A1 * | 9/2018 | Patel .................... G06V 10/82 |
| 2018/0284955 | A1 | 10/2018 | Canavor et al. |
| 2018/0336009 | A1 * | 11/2018 | Yoganandan ......... G06F 3/0346 |
| 2019/0102752 | A1 | 4/2019 | Valenti |
| 2019/0197599 | A1 | 6/2019 | Zia et al. |
| 2019/0205333 | A1 | 7/2019 | Piramuthu et al. |
| 2019/0205646 | A1 | 7/2019 | Piramuthu et al. |
| 2019/0205962 | A1 | 7/2019 | Piramuthu et al. |
| 2019/0206130 | A1 | 7/2019 | Ericson et al. |
| 2019/0244271 | A1 | 8/2019 | Piramuthu et al. |
| 2019/0244436 | A1 | 8/2019 | Stansell et al. |
| 2022/0101403 | A1 | 3/2022 | Piramuthu et al. |

FOREIGN PATENT DOCUMENTS

| | | | |
|---|---|---|---|
| WO | 2015191461 | A1 | 12/2015 |
| WO | 2019133849 | A1 | 7/2019 |
| WO | 2019133862 | A1 | 7/2019 |
| WO | 2019133891 | A1 | 7/2019 |
| WO | 2019133849 | A8 | 7/2020 |

OTHER PUBLICATIONS

Corrected Notice of Allowability Received for U.S. Appl. No. 16/235,290, dated Nov. 16, 2021, 2 Pages.

Corrected Notice of Allowability Received for U.S. Appl. No. 16/388,473, dated Oct. 21, 2021, 3 Pages.

Communication Pursuant to Article 94(3) EPC Received for European Patent Application No. 18839584.2, dated Nov. 12, 2021, 8 Pages.

Decision on Pre-Appeal Brief Request for U.S. Appl. No. 16/235,007, dated May 21, 2020, 2 pages.

Restriction Requirement received for U.S. Appl. No. 16/235,007 dated Apr. 17, 2019, 7 pages.

Corrected Notice of Allowability received for U.S. Appl. No. 16/235,007, dated Dec. 11, 2020, 13 pages.

Corrected Notice of Allowability received for U.S. Appl. No. 16/235,007, dated Dec. 28, 2020, 13 pages.

Final Office Action Received for U.S. Appl. No. 16/235,007, dated Nov. 27, 2019, 12 pages.

Non Final Office Action Received for U.S. Appl. No. 16/235,007, dated Feb. 7, 2020, 12 pages.

Non-Final Office Action received for U.S. Appl. No. 16/235,007, dated Jun. 13, 2019, 9 pages.

Notice of Allowance received for U.S. Appl. No. 16/235,007, dated Sep. 16, 2020, 18 pages.

Notice of Allowance received for U.S. Appl. No. 16/235,007, dated Nov. 3, 2020, 18 pages.

(56) References Cited

OTHER PUBLICATIONS

U.S. Appl. No. 16/235,007, filed Dec. 28, 2018, Allowed.
Non-final Office Action received for U.S. Appl. No. 16/235,290, dated Jun. 23, 2021, 7 Pages.
Notice of Allowance received for U.S. Appl. No. 16/235,290, dated Aug. 6, 2021, 11 pages.
Notice of Allowance received for U.S. Appl. No. 16/388,473, dated Sep. 14, 2021, 10 pages.
Zhao et al., "Memory-Augmented Attribute Manipulation Networks for Interactive Fashion Search", Retrieved from the Internet <http://zpascal.net/cvpr2017/Zhao_Memory-Augmented_Attribute_Manipulation_CVPR_2017_paper.pdf>, 2017, 9 pages.
What is Bing Visual Search API, Jul. 12, 2018, 129 pages.
Tang et al., "IntentSearch: Capturing User Intention for One-Click Internet Image Search", Retrieved from the Internet: URL:http://citeseerx.ist.psu.edu/viewdoc/download?doi=10.1.1.407.9573&rep=rep1&type=pdf[retrieved on Mar. 21, 2019], IEEE Transactions on Pattern Analysis and Machine Intelligence, Jul. 1, 2012, pp. 1342-1353.
International Written Opinion for PCT Application No. PCT/US2018/067982, dated May 13, 2019, 7 pages.
International Search Report for PCT Application No. PCT/US2018/067982, dated May 13, 2019, 7 pages.
International Preliminary Report on Patentability received for PCT Application No. PCT/US2018/067982, dated Jul. 9, 2020, 9 Pages.
International Written Opinion for PCT Application No. PCT/US2018/067945, dated Apr. 1, 2019, 11 pages.
International Search Report for PCT Application No. PCT/US2018/067945, dated Apr. 1, 2019, 5 pages.
International Preliminary Report on Patentability received for PCT Application No. PCT/US2018/067945, dated Jul. 9, 2020, 13 pages.
International Preliminary Report on Patentability received for PCT Application No. PCT/US2018/067925, dated Jul. 9, 2020, 11 pages.
Final Office Action Received for U.S. Appl. No. 16/235,140, dated Jul. 23, 2020, 32 Pages.
Final Office Action Received for U.S. Appl. No. 16/235,140, dated Oct. 18, 2019, 18 Pages.
Non Final Office Action Received for U.S. Appl. No. 16/235,140, dated Oct. 16, 2020, 36 Pages.
Non-Final Office Action Received for U.S. Appl. No. 16/235,140, dated Jan. 24, 2020, 29 pages.
Non-Final Office Action received for U.S. Appl. No. 16/235,140, dated May 10, 2019, 21 pages.
Restriction Requirement Received for U.S. Appl. No. 16/235,140, dated Feb. 26, 2019, 5 pages.
Final Office Action received for U.S. Appl. No. 16/235,290, dated Jul. 19, 2019, 26 pages.
Final Office Action Received for U.S. Appl. No. 16/235,290 dated May 13, 2020, 26 Pages.
Non Final Office action Received for U.S. Appl. No. 16/235,290 dated Nov. 13, 2019, 25 pages.
Non Final Office Action Received for U.S. Appl. No. 16/235,290, dated Sep. 18, 2020, 26 Pages.
Non-Final Office Action received for U.S. Appl. No. 16/235,290, dated Mar. 7, 2019, 21 pages.
Non Final Office Action Received for U.S. Appl. No. 16/388,473, dated Sep. 15, 2020, 22 Pages.

Anonymous, "Relative Attribute Comparisons for Interactive Image Search From Binary Attribute Labels", Anonymous AAAI submission, Paper ID: 905, 2018, 8 pages.
Branson et al., "Visual Recognition with Humans in the Loop", ECCV 2010. Lecture Notes in Computer Science, vol. 6314, 2010, 14 pages.
Brunelli et al., "Image Retrieval by Examples", IEEE Transactions on Multimedia, vol. 2, No. 3, IEEE Transactions on Multimedia, Sep. 10, 2000, pp. 164-171.
Funk et al., "Searching the Real World Using Stationary and Mobile Object Detection", Retrieved from the Internet: URL:http://makufunk.dejdownloadjfunk -antonius final.pdf—[retrieved on Mar. 22, 2019], University of Stuttgart, Stuttgart, Germany, Dec. 20, 2012, pp. 1-86.
Hsiao-Ti Eh Pu, "An Analysis of Web Image Queries for Search", National Taiwan Normal University, vol. 48, No. 1,, Oct. 22, 2003, pp. 340-348.
Kovashka et al., "Attribute Pivots for Guiding Relevance Feedback in Image Search", 2013 IEEE International Conference on Computer Vision, Dec. 1, 2013, 8 pages.
Kovashka et al., "WhittleSearch: Interactive Image Search with Relative Attribute Feedback", International Journal of Computer Vision, vol. 115, Apr. 4, 2015, pp. 185-210.
International Written Opinion for PCT Application No. PCT/US2018/067925, dated Apr. 2, 2019, 9 pages.
International Search Report for PCT Application No. PCT/US2018/067925, dated Apr. 2, 2019, 5 pages.
U.S. Appl. No. 16/388,473 , "Corrected Notice of Allowability received for U.S. Appl. No. 16/388,473, dated Jan. 19, 2022", Jan. 19, 2022, 5 Pages.
Corrected Notice of Allowability Received for U.S. Appl. No. 16/235,007, dated Feb. 26, 2021, 14 Pages.
Final Office Action Received for U.S. Appl. No. 16/235,140, dated Apr. 19, 2021, 36 Pages.
Final Office Action received for U.S. Appl. No. 16/235,290, dated Apr. 20, 2021, 27 Pages.
Final Office Action received for U.S. Appl. No. 16/388,473, dated Mar. 10, 2021, 25 pages.
Non Final Office Action Received for U.S. Appl. No. 16/388,473, dated May 6, 2021, 25 pages.
Miller, Am., "Valuing Watches, Coin Jewelry, Carvings, and other Articles. In: Gems and Jewelry Appraising", Springer, Boston, MA. https://doi.org/10.1007/978-1-4684-1404-2_6, 1988, 2 pages.
U.S. Appl. No. 17/550,350, "Non-Final Office Action", U.S. Appl. No. 17/550,350, dated Nov. 25, 2022, 31 pages.
Adams, Jr., George T, "Empowering Consumers as Capable Guardians to Prevent Online Product Counterfeiting Victimization in the Athletic Footwear Industry: A Routine Activity Perspective", Michigan State University ProQuest Dissertations Publishing, Order No. 10107493 [retrieved Dec. 2, 2022]. Retrieved from the Internet <https://www.proquest.com/openview/123b636eef9966c9942db8b7d5834d76/1?pq-origsite=gscholar&cbl=18750>, 2016, 165 pages.
Simms, Nicole Colleen, "The Counterfeit Consumer: Counterfeit Luxury Goods and the Negotiation of Space and Subjectivity", University of Minnesota ProQuest Dissertations Publishing, Order 3490786 [retrieved Dec. 2, 2022]. Retrieved from the Internet <https://www.proquest.eom/openview/2c79833a54d3f0b40dca7bf6456677ab/1 ?pq-prigsite=gscholar&cbl=18750>, Dec. 2011, 333 pages.

\* cited by examiner

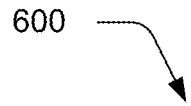

600

602
Monitor manipulation by a user of a digital image via a user interface as focusing on an object or characteristic of the object in the digital image

604
Assign the user to a user segment of a user population based on the manipulation as focusing on the object or characteristic of the object

606
Generate a recommendation based on the assigned user segment

608
Control digital content output based on the generated recommendation

*Fig. 6*

COMPUTER VISION, USER SEGMENT, AND MISSING ITEM DETERMINATION

RELATED APPLICATIONS

This application claims priority to U.S. patent application Ser. No. 16/235,007, filed Dec. 28, 2018, titled "Computer Vision, User Segment, and Missing Item Determination", which claims priority under 35 U.S.C. § 119(e) to U.S. Provisional Patent Application No. 62/612,275, filed Dec. 29, 2017, and titled "Computer Vision," the entire disclosures of which are incorporated here by reference.

BACKGROUND

Search is one of the primary techniques, via which, users of computing devices may locate information of interest. Users, for instance, may enter search queries to find digital content (e.g., digital images, video, music, and so on), locate products or services, and so on. This is typically performed as a keyword search in which a user expresses a goal of the search to the best of their ability using text. This text is then matched to items of digital content that are tagged using similar keywords.

Conventional search techniques, however, are typically repetitive and as a result may involve performance of repeated user interactions. A user, for instance, may initiate a search by a computing device for an item of interest. If that item is not found, the user is then forced to manually repeat the search. This may be due to unavailability of the item of interest or due to a disconnect between how a goal of a search is expressed by a user using text and how the item of interest is tagged. Forced repetition as part of these conventional systems may thus hinder operation of the computing devices that implement the search functionality and result in user frustration.

Further, search techniques may encounter additional challenges based on a configuration of a computing device, via which, the search is to be initiated. Mobile devices, for instance, have become an integral part of a user's everyday life. For example, a mobile phone may be used to read emails, engage in social media, capture digital images, communicate via instant messages, and so forth. Likewise, wearable devices such as smart watches have continued to expand this interaction. Accordingly, users have access to a wide range of devices in a variety of usage scenarios.

However, configuration as a mobile device may introduce challenges and complexity in support of user interactions with these devices. A mobile phone or smart watch, for instance, may have a limited ability to support entry of text, navigate between files, and so on. Accordingly, user interaction with these devices may be limited and cause computational inefficiencies as a result.

SUMMARY

Techniques and systems are described that leverage computer vision as part of search to expand functionality of a computing device available to a user and increase operational computational efficiency as well as efficiency in user interaction. In a first example, user interaction with items of digital content is monitored. Computer vision techniques are used to identify digital images in the digital content, objects within the digital images, and characteristics of those objects. This information is used to assign a user to a user segment of a user population which is then used to control output of subsequent digital content to the user, e.g., recommendations, digital marketing content, and so forth.

In a second example, techniques are described for surfacing listings of products and services to client device users by attempting to determine products and services that these users are likely to want, and then surfacing the determined products and services. A machine-learning model (e.g., a neural network), for instance, may be trained by the computing device using a plurality of training digital images. The plurality of training digital images depict physical environments and items disposed in the physical environments. Thus, the training digital images depict "good" examples of physical environments and the items (e.g., objects) disposed in those environments. From this, the machine-learning module "learns" which items are typically included in particular physical environments and/or in combination with other items. The trained model is then used to implement the missing item techniques. A subsequent digital image, for instance, may be generated by a digital camera of a computing device as a "live feed" of digital images of a physical environment. A determination is then made that an item is missing in the subsequent physical environment based on the subsequent digital image and the trained machine-learning model by the computing device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 6 is a flow diagram depicting a procedure in an example implementation in which monitored manipulation of a user with a digital image as focusing on an object or characteristic is used to assign the user to a user segment.

DETAILED DESCRIPTION

Overview

Figure 1:
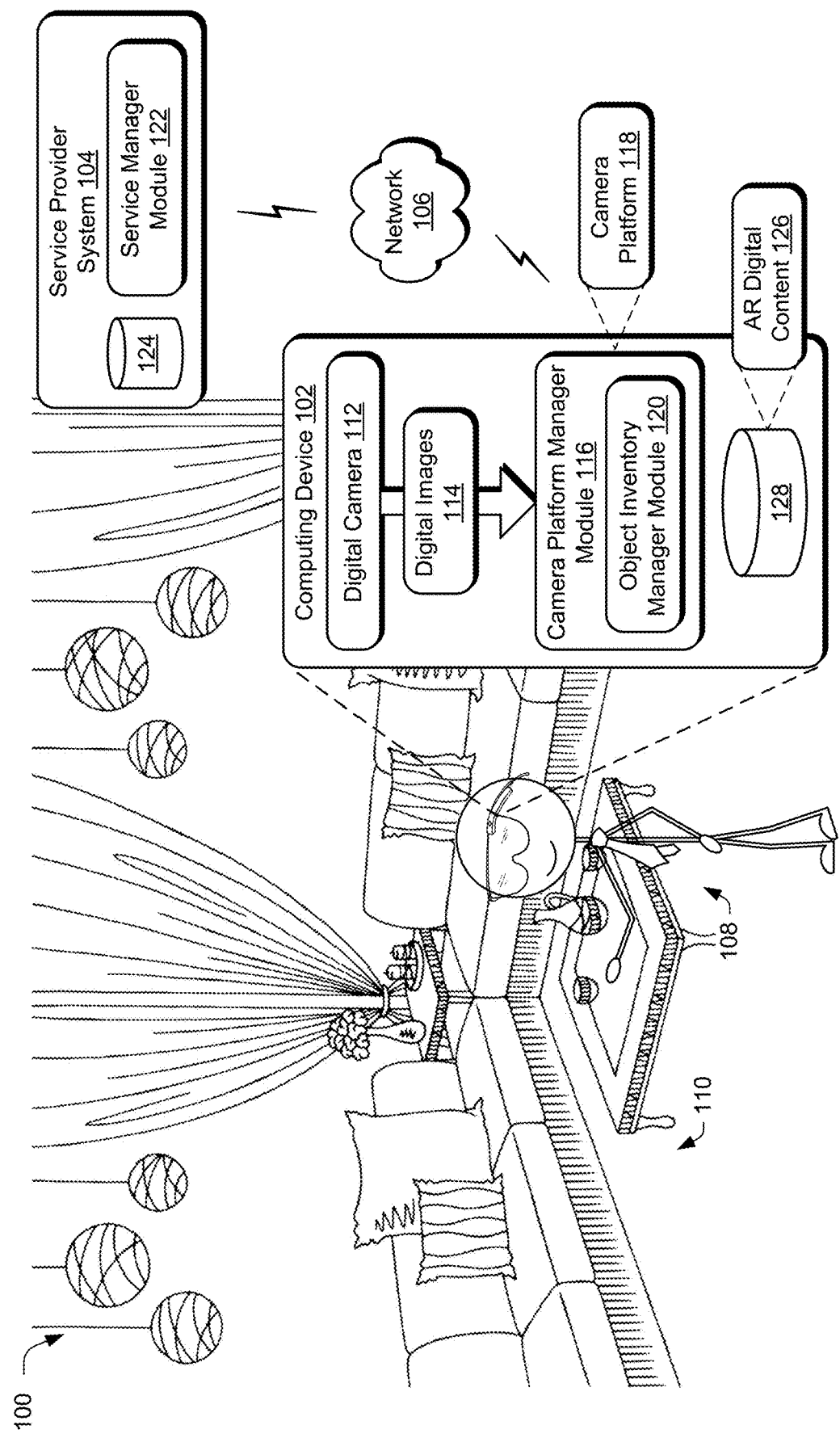
FIG. 1 is an illustration of an environment in an example implementation that is operable to employ camera platform techniques described herein.

Conventional search techniques may involve repeated attempts to locate a desired product or service due to unavailability of the item of interest. This may also be due to a disconnect between how a goal of a search is expressed by a user using text and how the item of interest is tagged in order to locate the item. These challenges may also be exacerbated based on a type of computing device that is to initiate the search, e.g., due to limitations of text entry and limited display sizes (if available) for mobile devices, artificial assistant systems, and so forth. This results in computational inefficiency as well as user frustration.

Accordingly, techniques and systems are described that leverage computer vision as part of search to expand functionality of a computing device available to a user and increase operational computational efficiency as well as efficiency in user interaction. In a first example, user interaction with items of digital content is monitored. Computer vision techniques are used to identify digital images in the digital content, objects within the digital images, and characteristics of those objects. This information is used to assign a user to a user segment of a user population which is then used to control output of subsequent digital content to the user, e.g., recommendations, digital marketing content, and so forth.

To do so, the computer vision techniques as implemented to monitor manipulation by a user via a user interface with a digital image as focusing on an object or characteristic of the object in the digital image. The user, for instance, may perform a gesture which is recognized by a computing device as "zooming in" on a particular portion of the digital image. The computer vision techniques, as implemented by the computing device, may then determine whether the user is interested in a particular object or characteristic. Object recognition techniques, for instance, may be performed using a classifier as part of machine learning to recognize an object in the portion when "zoomed in" and thus the user is likely interested in the object. This may also be used to determine a characteristic of the object. A user, for instance, may "zoom in" via a gesture such that the object is not recognizable, but characteristics of the object are such as material, color, pattern, and so forth. In this way, the computer vision techniques as implemented by a computing device may then determine that the user is interested in the color and not the object. In another example, both the object and the characteristic of the object may be inferred by the computing device.

This focus as inferred by the computing device using these computer vision techniques increases accuracy of determining user interest over conventional techniques that rely on the digital image as a whole. Conventional techniques, for instance, may rely on tags that refer to characteristics of an entirety of the digital image, e.g., involving each of the objects and characteristics included in the digital image. The user, on the other hand, may not be interested in each of these objects. Accordingly, the techniques described herein may determine with an increased amount of resolution which objects and characteristics of the objects are a focus of the user interest through monitoring user manipulation of the digital images. This may also be used to determine which object and characteristics of the object that are not of interest to the user. This may be based, for instance, on particular types of objects, colors, and so on that are included in the digital images but are not subject to this manipulation. From this, it may be inferred that the user is not interested in these types of objects or characteristics. As a result, a computing device that implements these techniques experiences increased operational efficiency in digital content control (e.g., accuracy in recommendations and digital marketing content) and user inefficiency in interacting with this content. Further discussion of these and other examples is included in the Computer Vision and User Segment section in the following and is illustrated in FIGS. 3-10.

In a second example, techniques are described for surfacing listings of products and services to client device users by attempting to determine products and services that these users are likely to want, and then surfacing the determined products and services. Conventional systems may determine these products and services based on a variety of information collected about a user, such as search queries entered (by text, voice, and so on) by the user, web pages to which the user has navigated, content of personal communications (e.g., email, text messages, instant messages, and so on), content posted on the user's social media profile, and so forth. However, such conventional systems fail to consider combinations of products depicted in a user's digital image, e.g., from a single digital image or part of a video. As a result, these conventional techniques fail to account for how users combine products and services acquired into a particular "look and feel". Without considering this "look and feel," conventional systems can surface products and services that do not match the actual tastes of users.

To overcome these problems, complete-the-look techniques are leveraged by a computing device in a digital medium environment. The complete-the-look techniques are used by the computing device to process a digital image and from this identify products and services to surface to a user as digital content, e.g., via an e-commerce platform, as digital marketing content, and so on. As part of this, the complete-the-look techniques are used by the computing device to initially determine items in digital images, such as by using one or more object recognition techniques. By way of example, the complete-the-look techniques may be used to determine items in a live stream of digital images (e.g., video) captured of a living room, such as couches, lamps, side tables, and so on. The complete-the-look techniques are then used to associate information with the digital image that is indicative of the detected items, e.g., text tags indicative of the detected items. For instance, the complete-the-look techniques may associate text tags with the video of the living room that are indicative of the detected items in the living room, e.g., metadata. A catalog of this digital image and associated information can be maintained in storage.

From the digital image and the associated information, the complete-the-look techniques are then used by the computing device to determine common items in the digital image. By way of example, the complete-the-look techniques may be used to determine that rooms having couches, lamps, side tables, and so on, also typically include televisions. Given the determined common items, the complete-the-look techniques are also able to determine items that are "missing" from digital images corresponding to certain contexts. Assume that the complete-the-look techniques are used to determine that digital images corresponding to living rooms do typically include couches, lamps, side tables, and televisions. In this scenario, the complete-the-look technique as implemented by a computing device receives a digital image from a user of a living room that depicts a couch, lamp, and side table, but not a television. Based on this, the complete-the-look techniques are used to determine that a television is missing from the living room. To "complete-the-look," the complete-the-look techniques can surface televisions listed via one or more listing services to the user.

This may also be performed using machine-learning techniques. A machine-learning model (e.g., a neural network), for instance, may be trained by the computing device using a plurality of training digital images. The plurality of training digital images depict physical environments and items disposed in the physical environments. Thus, the training digital images depict "good" examples of physical environments and the items (e.g., objects) disposed in those environments. From this, the machine-learning module "learns" which items are typically included in particular physical environments and/or in combination with other items. The trained model is then used to implement the missing item techniques.

A subsequent digital image, for instance, may be generated by a digital camera of a computing device as a "live feed" of digital images of a physical environment. A determination is then made that an item is missing in the subsequent physical environment based on the subsequent digital image and the trained machine-learning model by the computing device.

In response, computing device may indicate which item is missing. In one example, the computing device locates AR digital content that corresponds to the item that is missing, e.g., as a listing of products or services that are available for sale from the service provider system and represented by the AR digital content. The located AR digital content is then output as part of the live feed of digital images by the computing device. In this way, the missing items may be detected and surfaced to a user automatically and without user intervention and displayed as appearing in a physical environment of a user, thereby improving computational and user efficiency. Further discussion of these and other examples is included in the Computer Vision and Missing Item section and is illustrated in FIGS. 11-14.

In the following discussion, an example environment is first described that may employ the techniques described herein. Example procedures and systems are also described and shown as blocks which may be performed in the example environment as well as other environments. Consequently, performance of the example procedures is not limited to the example environment and systems and the example environment and systems are not limited to performance of the example procedures.

Example Environment

FIG. 1 is an illustration of a digital medium environment 100 in an example implementation that is operable to employ computer vision techniques described herein. The illustrated environment 100 includes a computing device 102 that is communicatively coupled to a service provider system 104 via a network 106. Computing devices that implement the computing device 102 and the service provider system 104 may be configured in a variety of ways.

A computing device, for instance, may be configured as a desktop computer, a laptop computer, a mobile device (e.g., assuming a handheld configuration such as a tablet or mobile phone), configured to be worn (e.g., as goggles as illustrated for computing device 102) and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" for the service provider system 104 as described in FIG. 15.

The computing device 102 is illustrated as being worn by a user 108 in a physical environment 110, e.g., a living room. The computing device 102 includes a digital camera 112 that is configured to capture digital images 114 of an outside physical environment (e.g., the living room), such as through use of a charge coupled device (CCD) sensor. The captured digital images 114 may then be stored as pixels in a computer-readable storage medium and/or rendered for display by a display device, e.g., LCD, OLED, LED, etc.

The computing device 102 also includes a camera platform manager module 116 that is configured to implement and execute a camera platform 118 (e.g., through use of a processing system and computer-readable storage media) that may serve as a basis for a variety of functionality. The camera platform 118, for instance, may implement a "live view" formed of digital images 114 taken of the physical environment of the computing device 102. These digital images 114 may then serve as a basis to support other functionality.

An example of this functionality is illustrated as an object inventory manager module 120. The object inventory manager module 120 is representative of functionality to manage an inventory of objects. This may include objects that are owned by the user 108 and/or objects that are desired by the user 108, e.g., for purchase. This may be implemented by the object inventory manager module 120 through use of the camera platform 118 in a variety of ways.

In a first such example, the object inventory manager module 120 is configured to collect digital images 114. This may include digital images 114 of physical objects in the living room in this example or digital images captured of physical photos, e.g., from a magazine, a picture taken of a television screen or other display device, and so on. The digital images 114 may also be captured of a user interface output by the computing device 102, e.g., as a screenshot from a frame buffer.

The object inventory manager module 120 includes object recognition functionality to recognize objects included within the digital images 114, e.g., via machine learning. From this, the object inventory manager module 120 may collect data pertaining to this recognition. Data describing the recognized objects, for instance, may be communicated via the network 106 to the service provider system 104. The service provider system 104 includes a service manager module 122 that is configured to obtain data related to the objects (e.g., through use of a search) from a storage device 124. This data may then be communicated back to the computing device 102 via the network 106 for use by the object inventory manager module 120.

The object inventory manager module 120, for instance, may generate augmented reality digital content 126 (illustrated as stored in a storage device 128) for output in the user interface of the computing device 102 as part of a "live feed" of digital images taken of the physical environment, e.g., the living room. The AR digital content 126 may describe characteristics of the object, a brand name of the object, a price for which the object is available for sale or purchase (e.g., via an online auction), and so forth. This AR digital content 126 is then displayed proximal to the object by the object inventory manager module 120. In this way, the camera platform supports functionality for the user 108 to "look around" the physical environment 110 and provides additional information and insight into characteristics of objects included within the physical environment 110.

In another example, the object inventory manager module 120 leverages the camera platform 118 to make recommendations for a user. The digital images 114, for instance, may also be processed by the object inventory manager module 120 using object recognition as implemented using machine learning. In this example, the digital images are used to generate a profile (e.g., a user profile) based on characteristics learned from the digital images 114. This profile is then used as a basis to form recommendations (e.g., through machine learning), such as to configure digital marketing content having product suggestions based on these characteristics.

The profile, for instance, may include digital images taken of the user 108. From this, the object inventory manager module 120 may determine characteristics and tastes of the user 108. Digital images may also be collected from sources that do not include the user but are desired by the user, e.g., of other humans in person, from physical photos, and so forth. From this, the object inventory manager module 120 may generate recommendations based on the user profile. In this way, the object recognition module may increase accuracy and as a result increase computational efficiency in generation of recommendations based on the camera platform 118.

Figure 2:
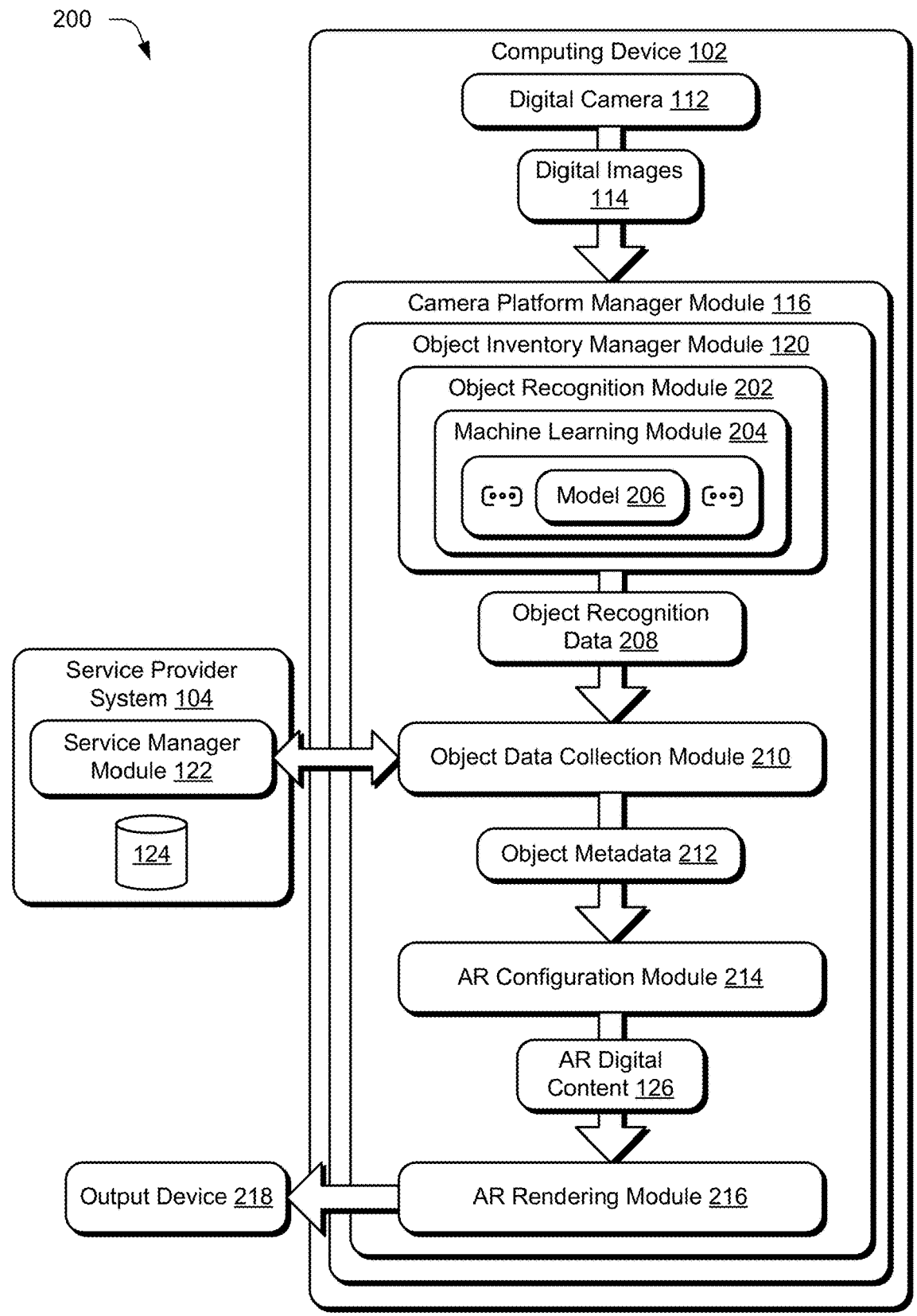
FIG. 2 depicts a system in an example implementation showing operation of a camera platform manager module of FIG. 1 in greater detail.

FIG. 2 depicts a system 200 in an example implementation showing operation of the camera platform manager module 116 of FIG. 1 in greater detail. The following discussion describes techniques that may be implemented utilizing the previously described systems and devices. Aspects of the procedure as shown stepwise by the modules of FIG. 2 may be implemented in hardware, firmware, software, or a combination thereof. The procedure is shown as a set of blocks that specify operations performed by one or more devices and are not necessarily limited to the orders shown for performing the operations by the respective blocks.

To begin, a digital image 114 is obtained by the camera platform manager module 116. The digital image 114, for instance, may be captured using a digital camera 112, as a screenshot captured from a frame buffer of the computing device 102, and so forth. The digital image 114 is then processed by an object recognition module 202 to recognize an object within the digital image 114 or characteristics of the object, e.g., material, color, pattern, and so forth. The object recognition module 202, for instance, may employ a machine-learning module 204 configured to employ models 206 as a classifier usable to recognize the object using machine learning, e.g., neural networks, convolutional neural networks, deep learning networks, structured vector machines, decision trees, and so forth. The models 206, for instance, may be trained using training digital images that are tagged with corresponding identifications of the objects and/or characteristics of the objects.

In an implementation, these training digital images and tags are obtained from a commerce service provider system that are tagged by sellers using the system. As a result, a multitude of accurately tagged training digital images may be obtained with minimal computation and user cost as opposed to conventional manual tagging techniques. Although illustrated as implemented locally by the computing device 102, this functionality may also be implemented in whole or in part by a service provider system 104 via the network 106.

Thus, the object recognition data 208 describes an object included in the digital image 114 and/or characteristics of the object. An object data collection module 210 is then employed to collect object metadata 212 that pertains to the recognized object or characteristics of the object. This may be performed locally through a search of a local storage device and/or remotely through interaction with a service manager module 122 of a service provider system 104 via a network 106.

A variety of different types of object metadata 212 may be obtained from a variety of different types of service provider systems 104. In one example, the service provider system 104 provides information relating to purchase or sale of the object, e.g., product name, product description, price for purchase or sale (e.g., based on online auctions), and so forth. In another example, the service provider system 104 provides information relating to customer reviews of the product, e.g., a number of "stars" or other rating, textual reviews, and so forth. In a further example, the metadata describes replacement parts of the object, e.g., filters, batteries, bulbs, and so forth. The object metadata 212 in this instance may be used to then order these replacement parts in an efficient and intuitive manner, e.g., through selection of AR digital content formed from the metadata.

The object metadata 212 in this example is then provided to an augmented reality (AR) configuration module 214. The AR configuration module 214, for instance, may be configured to generate AR digital content 126 from the object metadata 212 for display proximal to the object by an AR rendering module 216 to an output device 218, e.g., display device, audio output device, tactile output device, and so forth. The augmented reality content in this example includes both content supported along with a direct view of a physical environment and content supported along with a recreated view of the physical environment. In this way, through use of a camera platform 118 as implemented by the camera platform manager module 116, a user may simply "look around" using a live feed of digital images 114, select objects in the digital images 114, and obtain metadata related to the object.

In the replacement part example, object recognition may be used to first identify an object. This identification may then be used as a "look up" to locate replacement parts associated with the object, e.g., filters, bulbs, batteries, and so forth. AR digital content may then be output that is selectable to purchase these items in a direct view in the user interface. In an example, this information is correlated with a past purchase history, such that the AR digital content may indicate "when" to replace the replacement part, when the replacement part was last purchased, when it is due to be replaced, and so forth. This may also be used to monitor user interaction to assign users to segments of a user population and for missing item determination, further discussion of which is included in corresponding sections in the following description.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Computer Vision and User Segment

Figure 3:
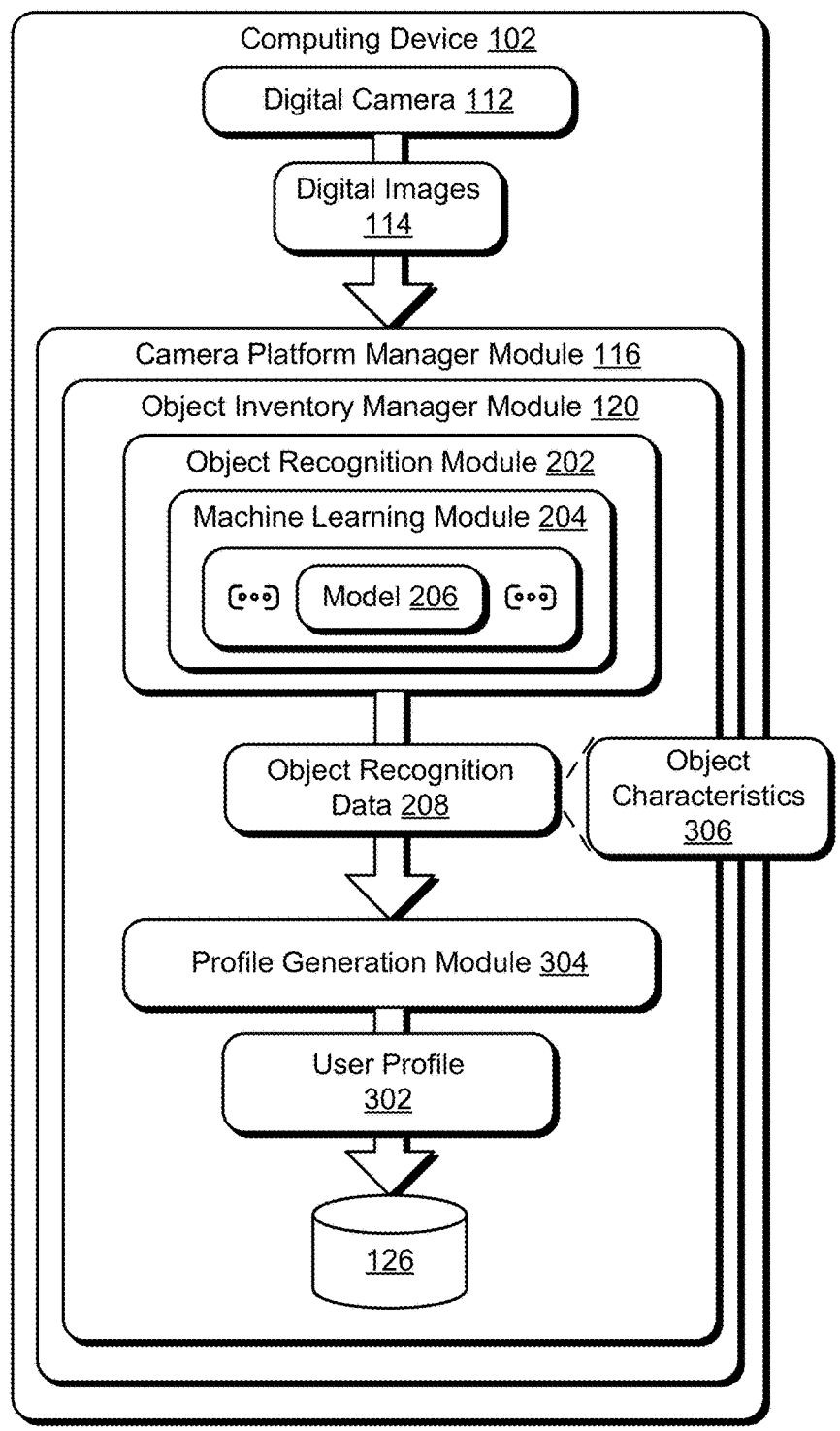
FIG. 3 depicts a system in an example implementation showing operation of the camera platform manager module of FIG. 1 in greater detail as employing a user profile.
Figure 4:
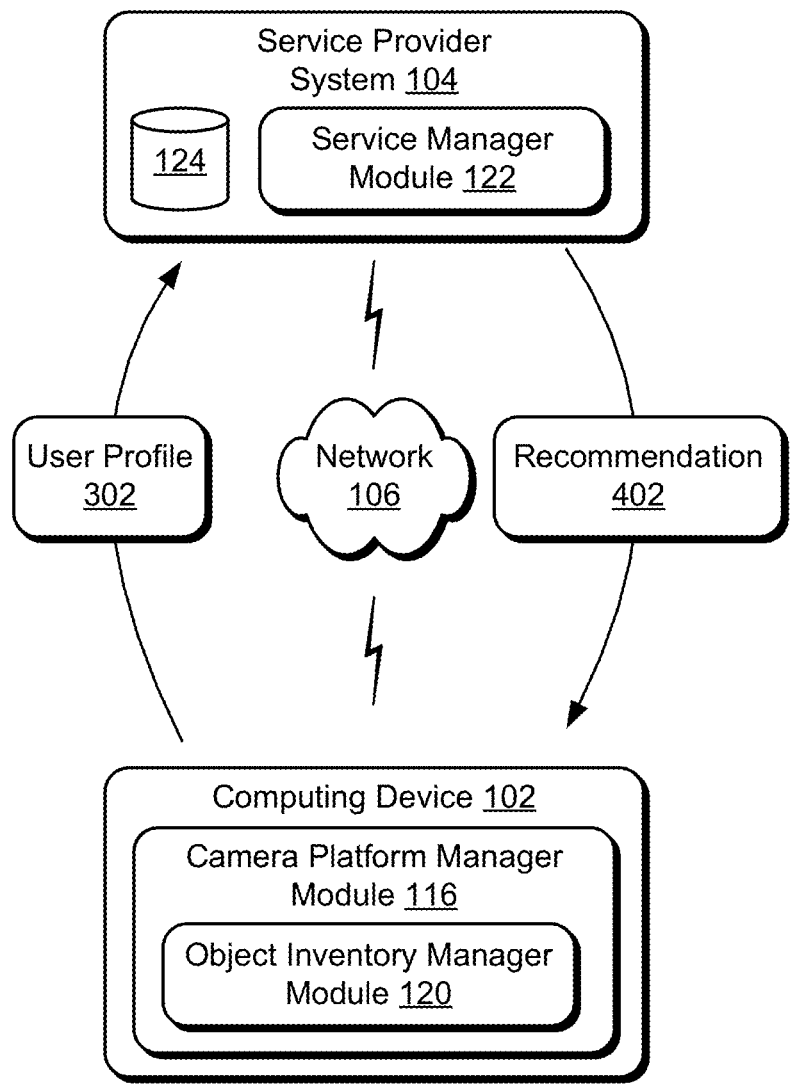
FIG. 4 depicts an example system of obtaining a recommendation based on the generated user profile of FIG. 3.
Figure 5:
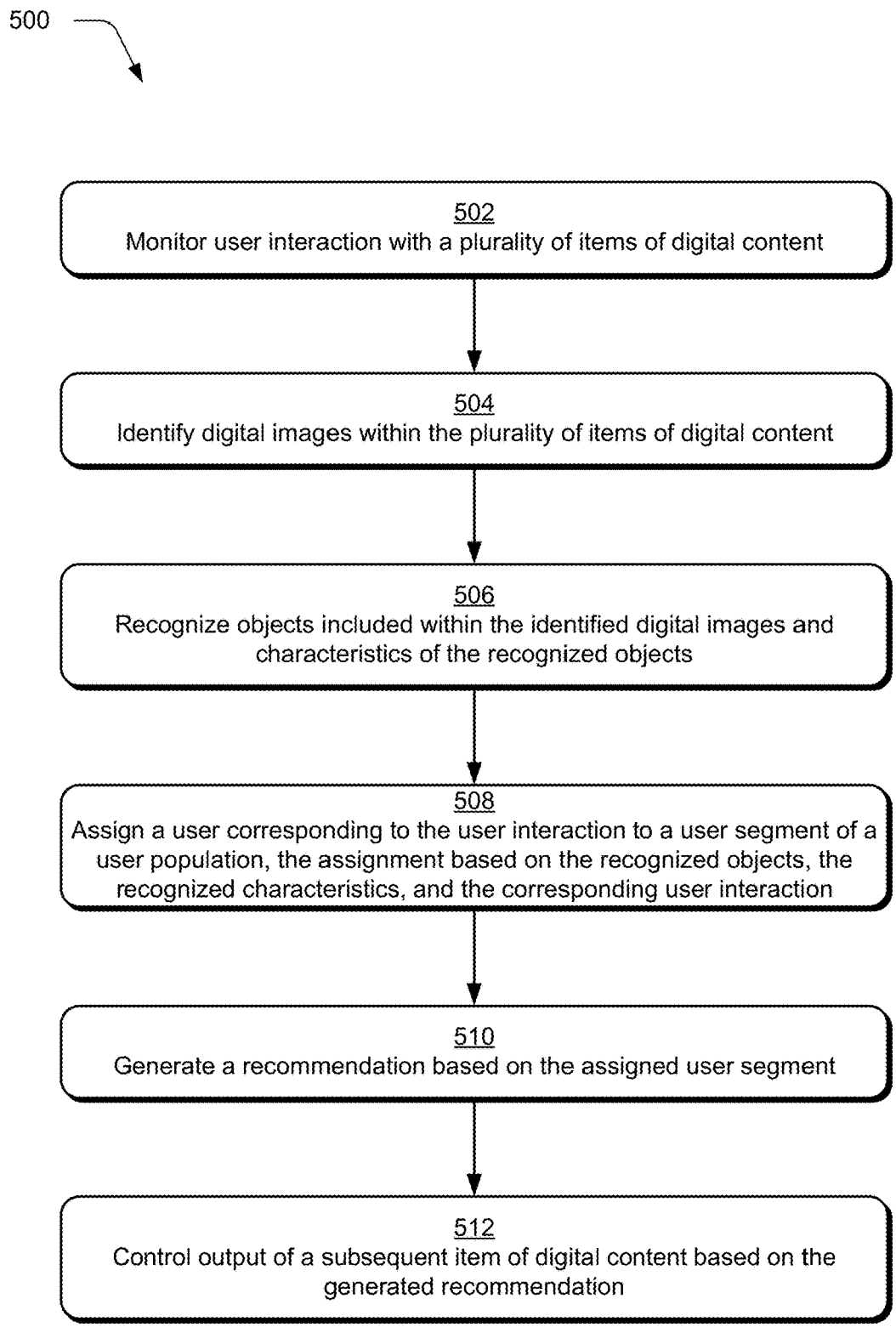
FIG. 5 is a flow diagram depicting a procedure in an example implementation in which a user is assigned to a user segment used to generate a recommendation based on monitored user interaction with digital images.

FIG. 3 depicts a system 300 in an example implementation showing operation of the camera platform manager module 116 of FIG. 1 in greater detail as employing a user profile. FIG. 4 depicts an example system 400 of obtaining a recommendation based on the generated user profile of FIG. 3. FIG. 5 depicts a procedure 500 in an example implementation in which a user is assigned to a user segment used to generate a recommendation based on monitored user interaction with digital images. FIG. 6 depicts a procedure 600 in which monitored manipulation of a user with a digital image as focusing on an object or characteristic is used to assign the user to a user segment. FIGS. 7-10 depict user interfaces showing examples 700, 800, 900, 1000 of user manipulation and focus.

The following discussion describes techniques that may be implemented utilizing the previously described systems and devices. Aspects of the procedure as shown stepwise by the modules of FIGS. 3 and 4 may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 3-10.

In this example, the object inventory manager module 120 leverages the camera platform 118 to control output of digital content to a user, e.g., make recommendations for a user 108, digital marketing content (i.e., ads), and so forth. The digital images 114, for instance, may also be processed by the object inventory manager module 120 using object recognition as implemented using machine learning. The digital images 114 are used to generate a profile (e.g., a user profile 302) based on characteristics learned from the digital images 114. This user profile 302 is then used as a basis to form recommendations (e.g., through machine learning as further described in relation to FIG. 4), such as to configure digital marketing content having product suggestions based on these characteristics.

To do so, object recognition data 208 is generated as previously described using an object recognition module 202 and machine learning as implemented by a machine-learning module 204 and associated model 206, e.g., as a classifier. The object recognition data 208 is then provided to a profile generation module 304 to generate the user profile 302.

The object recognition data 208 may be used to identify a type of object, e.g., running shoes, cars, etc. The object recognition data 208 may also be used to describe characteristics of the objects, e.g., a preference for "clean" uncluttered objects, types of patterns, types of materials, textures, and so on that are learned from the digital images. This may be used, for instance, to infer interests of "modern, clean, uncluttered" lines versus ornate, baroque lines. This may be performed in a variety of ways. In one example, the profile generation module 304 generates the user profile 302 as a set of rules to specify an association of user preferences with object characteristics 306. In another example, machine learning is employed, such as through the user of neural networks as part of classifiers which output a probability that the object is or is not a particular type of object, has a certain characteristic, and so forth. Machine learning may also be used to determine hidden states and associations of object characteristics 306 and user preferences.

The object recognition data 208, for instance, may be collected from webpages navigated to by a user, e.g., from a service provider system 104. This is therefore used to monitor user interaction "in the background" with the webpages and content of the webpages. Associated actions taken by the user to manipulate the digital image, e.g., to "click on" a digital image on the webpage, "zoom in," and so forth may then be incorporated as part of a loss function to learn the user preferences, e.g., to adjust weights and/or connections within a neural network. In an implementation, this is performed across different applications, webpages, and so forth, with which, a user has interacted using the computing device 102.

From this, the object inventory manager module 120 may generate recommendations based on the user profile 302. In this way, the object recognition module may increase accuracy and as a result increase computational efficiency in generation of recommendations based on the camera platform 118.

The user profile 302 may be formed based on digital images that originate from a variety of different sources. A user, for instance, may take a multitude of "selfies" and thus readily identify preferences of the user as related to the user, themselves. In this way, the selfies provide additional insight and thus accuracy of a model trained using machine learning regarding user preferences.

In another instance, this may be used to determine user preferences for particular types of products. The object recognition data 208, for instance, may describe a "type" of object captured from the digital images 114. Object characteristics 306 learned from the object recognition data 208 may then be used to train a model to associate those characteristics with particular types of products, e.g., red cars, black t-shirts, red phone cases, and so forth. This may also be used across product types, such as to continue with the previous example in which a user's preference for red cars and phone cases indicates a general overall preference for red products. In an implementation, a weighting may also be learned to combine product-type models with models used across product types to address overall user preferences with specific preferences regarding a particular product type.

FIG. 4 depicts an example of generation of the user profile 302 in greater detail. To begin, a digital image 114 is obtained by the camera platform manager module 116 as before. The digital image 114, for instance, may be captured using a digital camera 112, as a screenshot captured from a frame buffer of the computing device 102, a selfie, taken of a physical image from a physical medium, and so forth.

The digital image 114 is then processed by an object recognition module 202 to recognize an object and/or characteristics of the object within the digital image 114. The object recognition module 202, for instance, may employ a machinelearning module 204 configured to employ models 206 usable to recognize the object using machine learning, e.g., neural networks. The models 206, for instance, may be trained as classifiers using training digital images that are tagged with corresponding identifications. In an implementation, these training digital images and tags are obtained from a commerce service provider system that are tagged by sellers using the system. As a result, a multitude of training digital images may be obtained with minimal computation and user cost as opposed to conventional manual tagging techniques. Although illustrated as implemented locally by the computing device 102, this functionality may also be implemented in whole or in part by a service provider system 104 via the network 106.

Thus, the object recognition data 208 describes an object and/or characteristics of the object included in the digital image 114. The digital image 114 may also be captured of other users that have favorable characteristics, e.g., of a person on a street having a desired jacket, a digital image taken of a physical photograph of a popstar in a physical magazine, and so forth. Thus, this object recognition data 208 is collected to generate user profile data that describes the user and/or characteristics of other users as recognized from the digital image 114.

As shown in FIG. 4, the user profile 302 may then be communicated to the service provider system 104, which forms a recommendation 402 based on the user profile 302. The recommendation 402, for instance, may be generated using machine learning based on a user segment, to which, the user belongs as identified through non-negative matrix factorization. In this way, the camera platform 118 of the object inventory manager module 120 may address likely user desires based on the digital images and object recognition supported by the platform. Although described as implemented by the computing device 102, this functionality may also be implemented in whole or in part by the service provider system 104, e.g., in response to communicated images as part of a social network service.

FIG. 5 depicts a procedure 500 in an example implementation in which a user is assigned to a user segment used to generate a recommendation based on monitored user interaction with digital images. To begin, user interaction is monitored with respect to a plurality of items of digital content (block 502). The camera platform manager module 116, for instance, may monitor webpages, screens of a user interface output by an application executed by the computing device 102, and so on.

Digital images are identified within the plurality of items of digital content (block 504) that are subject of the user interaction. The camera platform manager module 116, for instance, may detect which digital images of a plurality of digital images within an item of digital content are selected (e.g., "clicked"), subject to the hovering of a cursor over the image, a gesture (e.g., to "zoom in"), spoken utterance, and so forth. Thus, the user interaction in this example helps to determine user interest in respective images by focusing on particular portions of the image.

Objects are recognized that are included within the identified digital images. Characteristics of the recognized objects are also recognized (block 506). The object recognition module 202, for instance, may be used to generate object recognition data 208 that identifies which objects are included in the digital images 114. This may also be used to describe object characteristics 306, such as patterns, textures, material properties, surface treatments of the materials (e.g., rusted, "industrial"), and so forth A user corresponding to the user interaction is assigned to a user segment of a user population. The assignment is based on the recognized objects, the recognized characteristics, and the corresponding user interaction (block 508). This may be used, for instance, to generate a model using machine learning. The model is trained based on this data in which the user interaction is used as part of a loss function to train the model based on corresponding user actions undertaken as part of the image. The user interactions, for instance, may indicate a user preference for certain colors, textures, materials, and so forth and thus the model may be used to reflect these user preference as part of generating a recommendation. This may also be used to indicate objects or characteristics that the user is not interested in, e.g., included in the digital images but are not subject to user manipulation as focusing on these objects or characteristics.

The object recognition data 208, for instance, may be used to define membership of the user within a particular segment of a user population, e.g., for digital marketing purposes. A recommendation is then generated by the computing device 102 based on the assigned user segment (block 510). Output is then controlled by the computing device of a subsequent item of digital content based on the generated recommendation (block 512), e.g., of an item of digital marketing content configured to cause conversion of a product or service. In this way, the recommendation is generated with increased accuracy over conventional techniques, which improves operation of a computing device that generates these recommendations.

FIG. 6 depicts a procedure 600 in which monitored manipulation of a user with a digital image as focusing on an object or characteristic is used to assign the user to a user segment. Manipulation by the user of a digital image via a user interface is monitored as focusing on an object or characteristic of the object in the digital image (block 602). A camera platform manager module 116, for instance, may monitor use interaction with a digital image output using a display device of the computing device 102. This interaction may occur in a variety of ways, such as a gesture (e.g., zoom in, zoom out, tap), cursor control device and keyboard (e.g., control button keypress and a scroll wheel), a spoken utterance, and so forth.

Figure 7:
FIGS. 7-10 depict user interfaces showing examples of user manipulation and focus.
Figure 8:
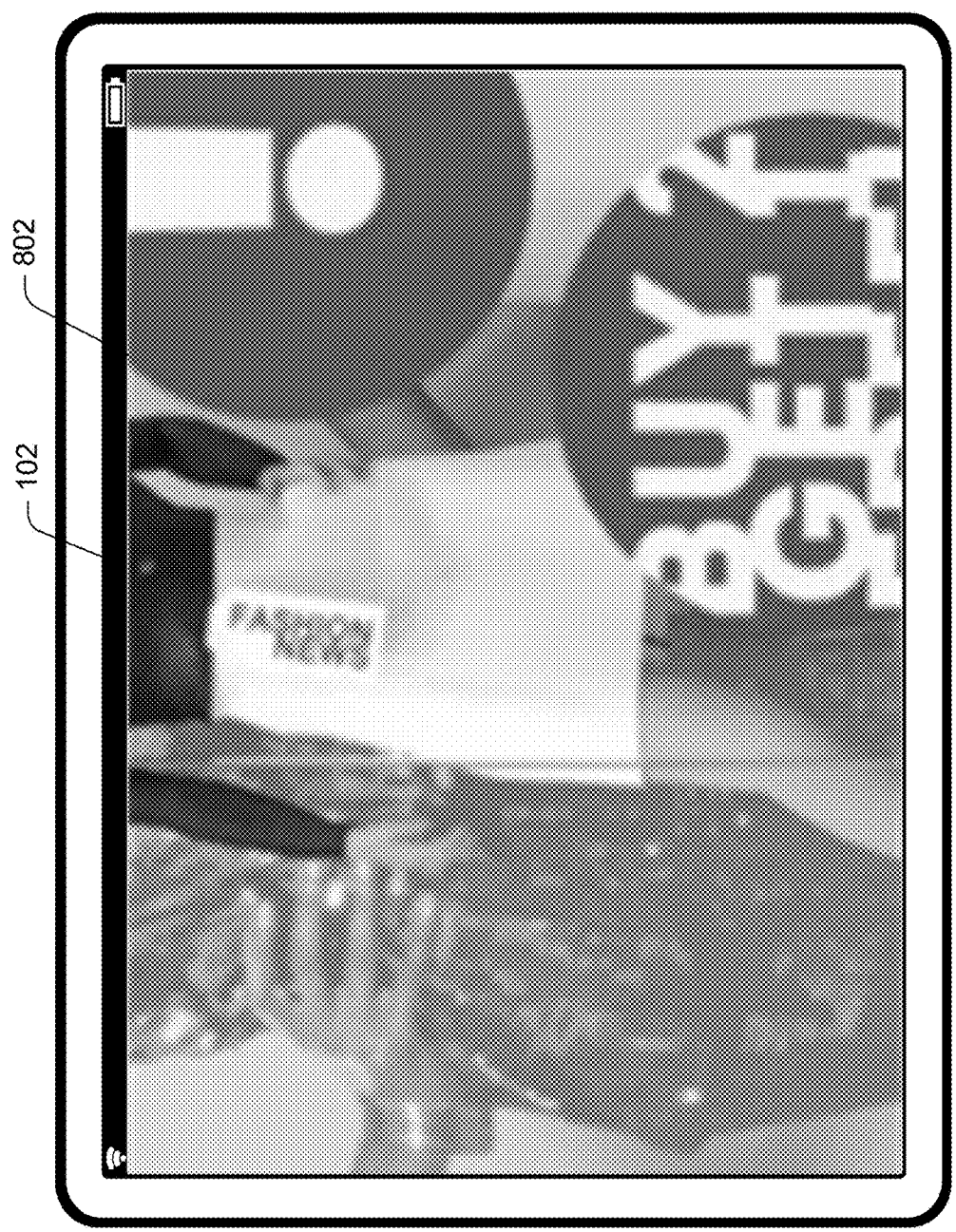
Figure 9:
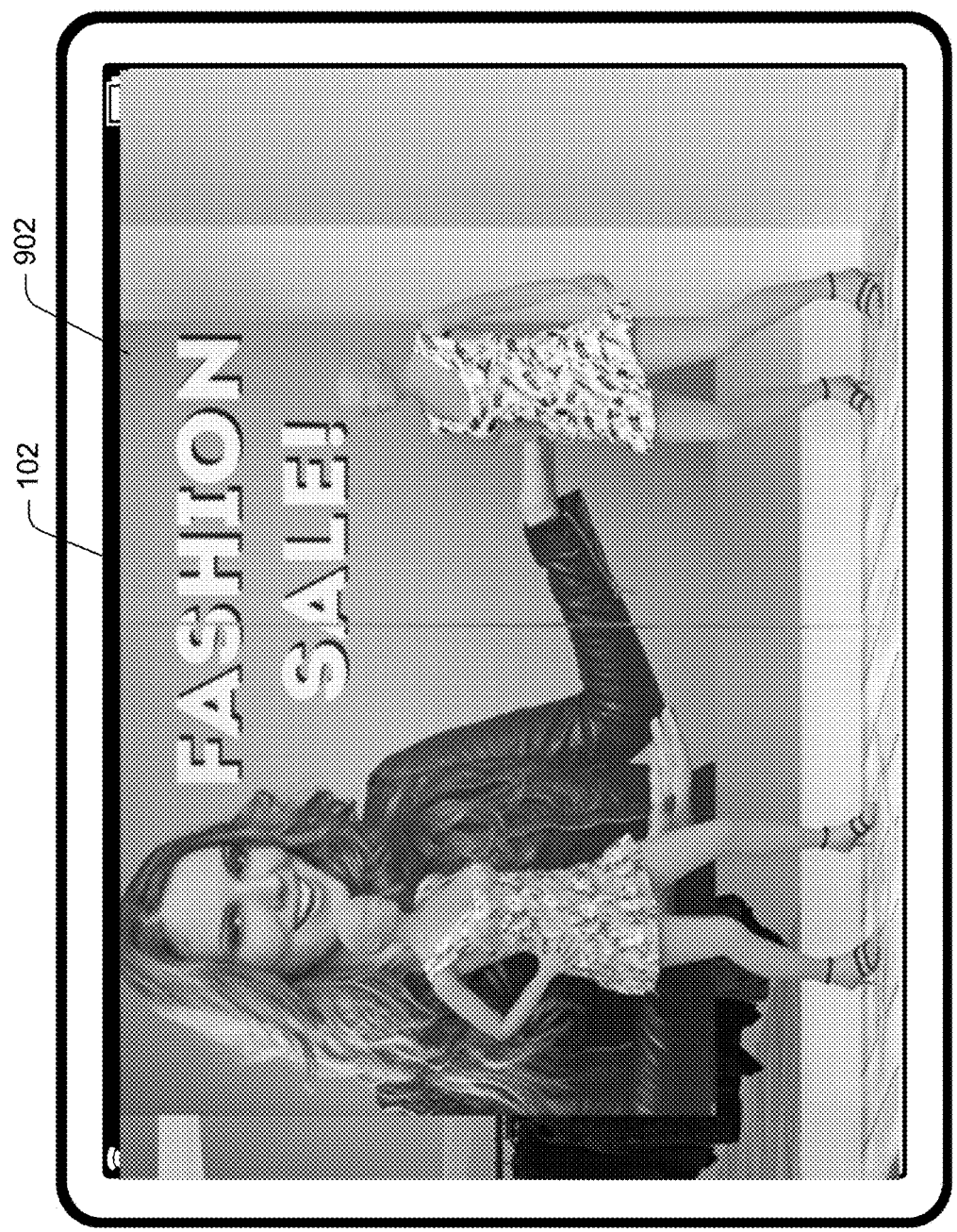

As shown in the example 700 of FIG. 7, for instance, a digital image 702 is displayed in a user interface of a display device of the computing device 102. The digital image 702 includes a variety of different products, which are clothing items in this example. In conventional techniques, a user's interest was specified for the digital image as a whole, which lacks accuracy because some objects in the digital image and even characteristics of the objects may be of interest while others may not.

In the illustrated example, however, manipulation by a user via user input received via the display device (e.g., using touchscreen functionality) is monitored to determine a focus of a user with respect to a particular portion of the digital image. A result of this focus is depicted in the example 800 of FIG. 8 in which a user has "zoomed in" to view a particular item of clothing in a corresponding portion 802 of the digital image 702 of FIG. 7.

This manipulation causes the camera platform manager module 116 to initiate object recognition techniques by an object recognition module 202 of the camera platform manager module 116 to identify an object and/or characteristics of the object in this portion of the digital image as previously described. In this way, the profile generation module 304 may generate a user profile to reflect this interest, and may also reflect disinterest in other objects and/or characteristics in the digital image 702 that are not subject to this manipulation, e.g., other clothing items, colors of the clothing items, and so forth.

Figure 10:
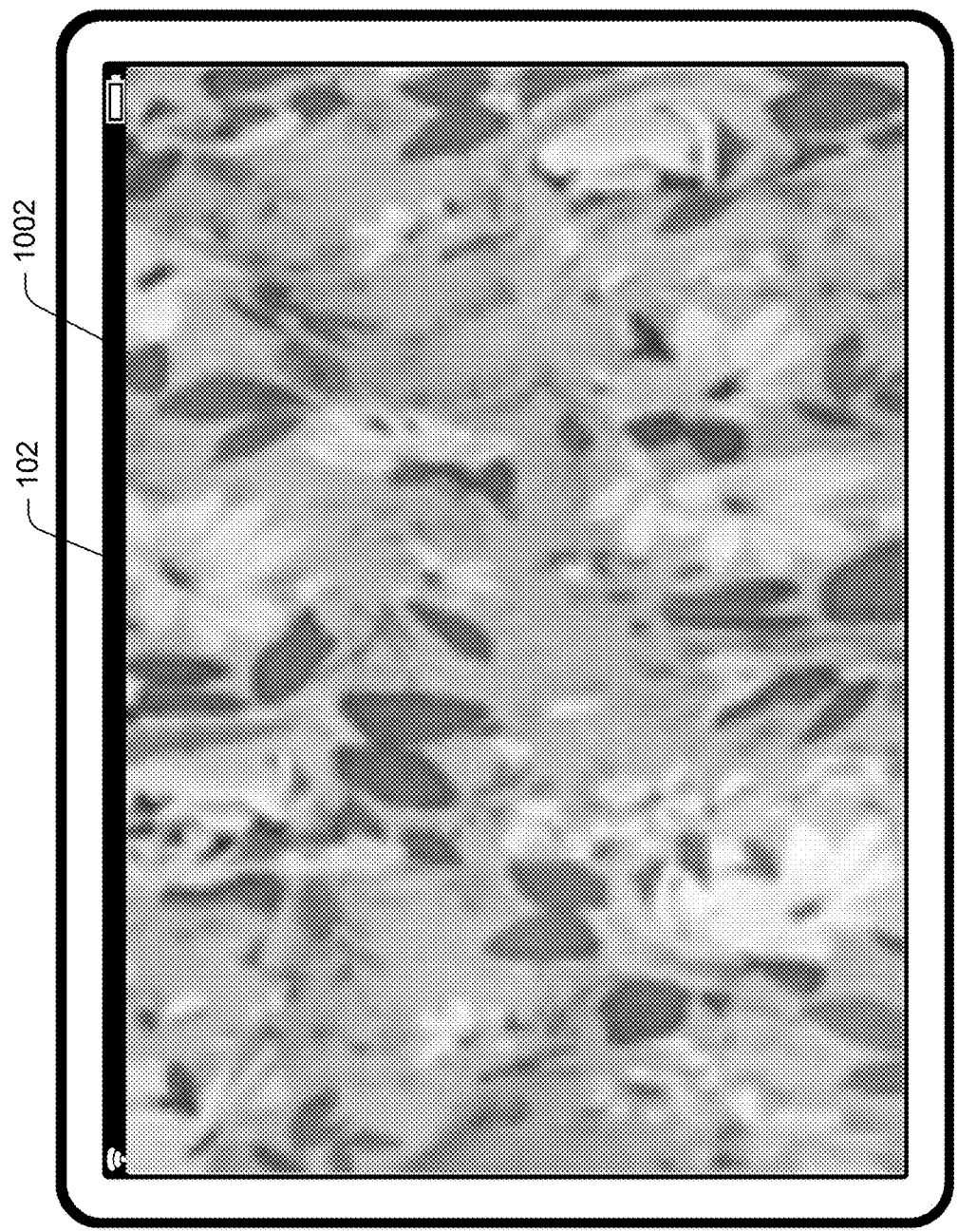

This may also be used to distinguish between interest in the object and interest in a characteristic of the object. As shown in the example 900 of FIG. 9, for instance, a digital image 902 is again output in a user interface of the computing device that includes multiple objects, e.g., items of clothing Manipulation of the digital image 902 in response to a user input causes the computing device 102 to zoom in to a portion 1002 of the digital image 902 as shown in FIG. 10. In this example, the portion 1002 is not sufficient to recognize the corresponding object using object recognition techniques. However, the portion is sufficient to recognize characteristics of the object, e.g., a color, pattern, material, and so forth. In this example, the user interest is focused on the characteristic, and not the object. This focus is used as part of the user profile 302 to assign a user to a corresponding segment as further described below. Other examples are also contemplated in which the object and characteristic are both employed for the assignment and/or generation of the user profile 302.

The user is then assigned to a user segment of a user population by the object inventory manager module 120. The assignment is based on the manipulation as focusing on the object or characteristic of the object (block 604) as described above. This assignment is then used to generate a recommendation (block 606) and control output of digital content (block 608) as described above. In this way, the camera platform manager module 116 supports increased accuracy and computational efficiency as compared with conventional digital content control techniques.

Computer Vision and Missing Item Determination

Figure 11:
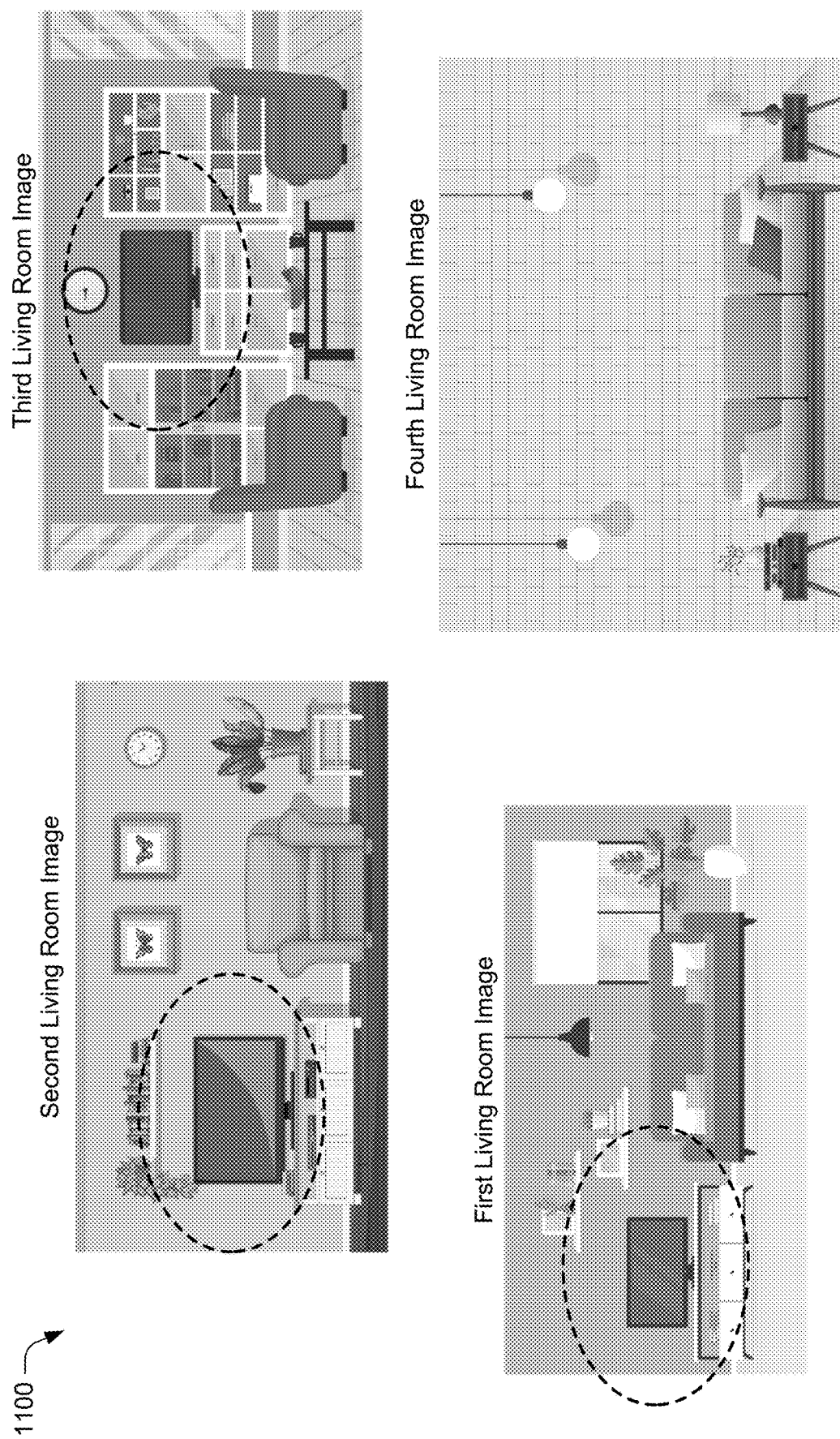
FIG. 11 depicts images of an example implementation in which items that are common to a particular context are determined from the images to enable a further determination of items that are missing from another image of the particular context.
Figure 12:
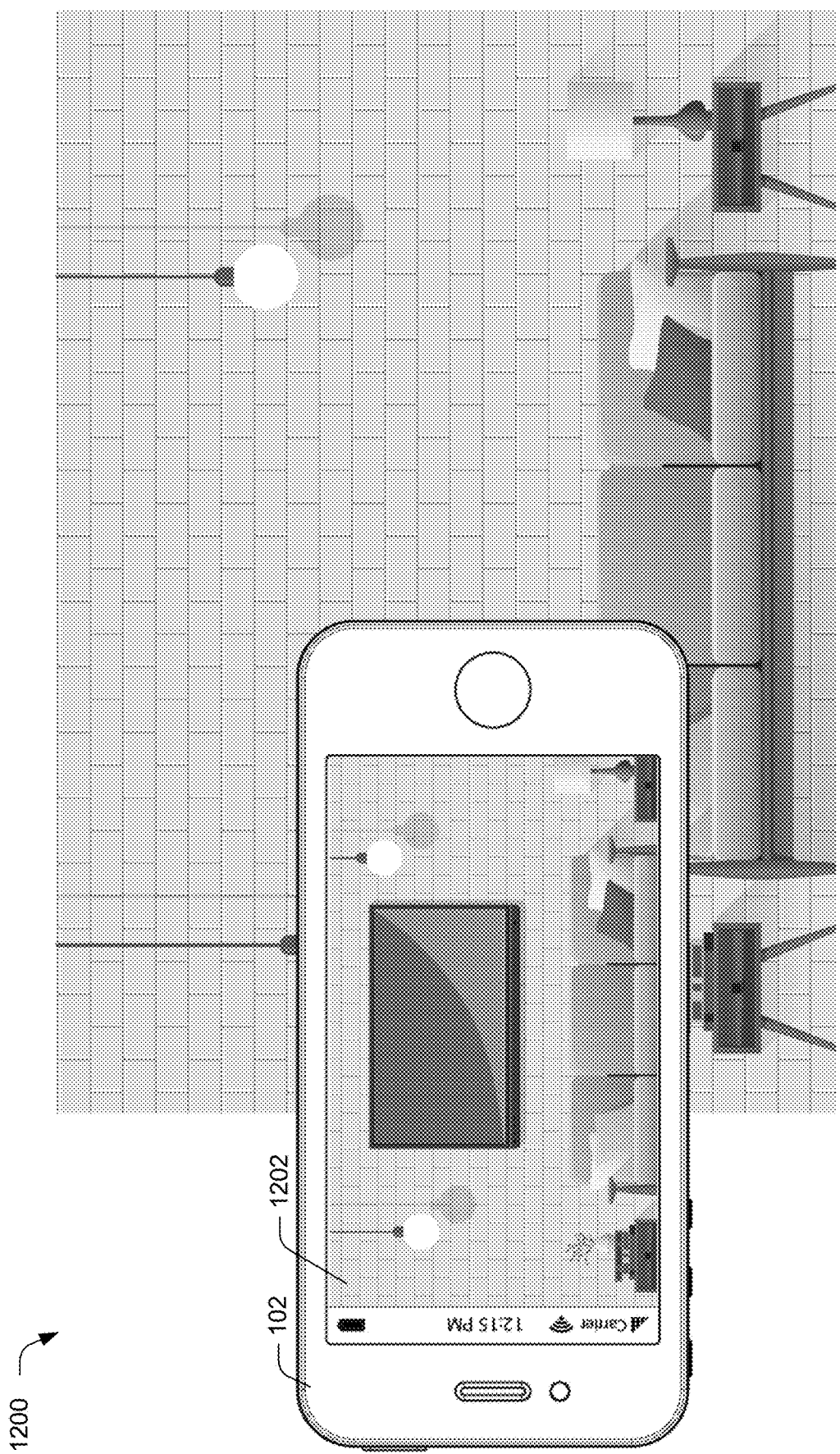
FIG. 12 depicts a scenario in an example implementation in which augmented and/or virtual reality (AR/VR) techniques are used to suggest items that are missing from a particular context.
Figure 13:
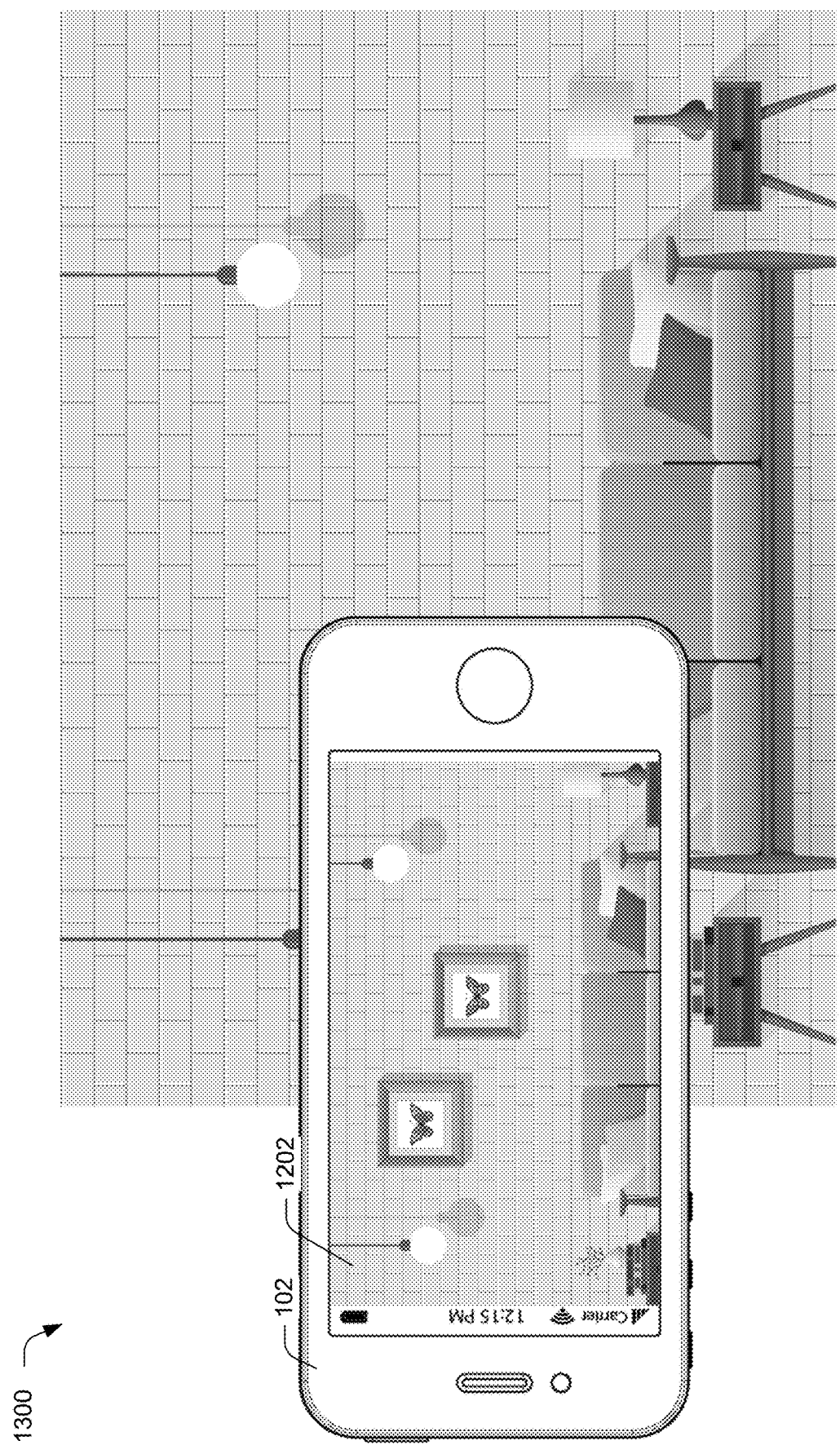
FIG. 13 depicts another scenario in an example implementation in which AR/VR techniques are used to suggest different items that are missing from the particular context.
Figure 14:
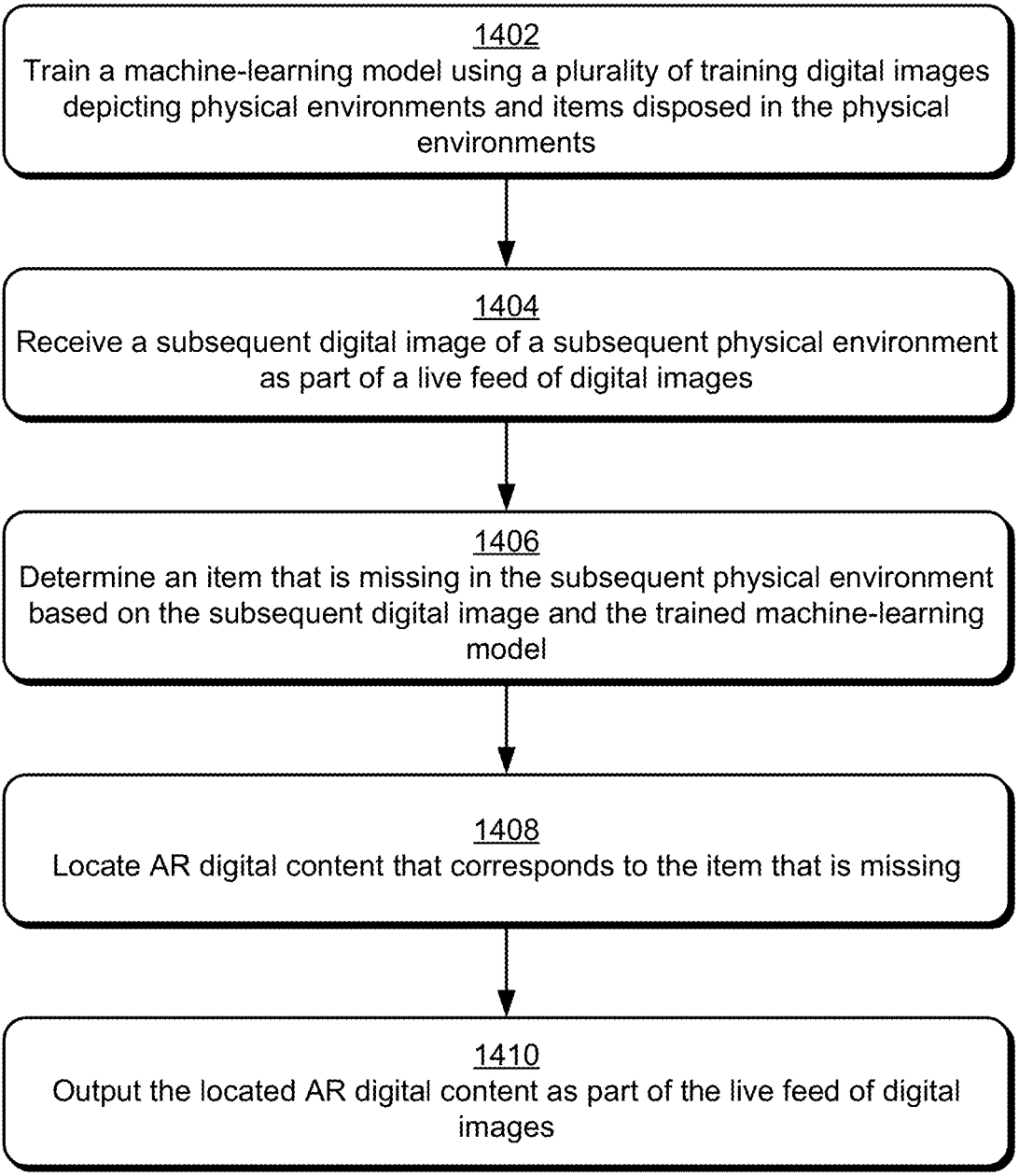
FIG. 14 is a flow diagram depicting a procedure in an example implementation in which machine-learning techniques and AR digital content are employed as part of missing item determination.

FIG. 11 depicts images of an example implementation in which items that are common to a particular context are determined from the images to enable a further determination of items that are missing from another image of the particular context. FIG. 12 depicts a scenario in an example implementation in which augmented and/or virtual reality (AR/VR) techniques are used to suggest items that are missing from a particular context. FIG. 13 depicts another scenario in an example implementation in which AR/VR techniques are used to suggest different items that are missing from the particular context. FIG. 14 depicts a procedure in an example implementation in which machine-learning techniques and AR digital content are employed as part of missing item determination.

The following discussion describes techniques that may be implemented utilizing the previously described systems and devices. Aspects of the procedure as shown stepwise may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 11-15.

Techniques are described as implemented by the camera platform manager module 116 for surfacing listings of products and services to users in an attempt to determine products and services that these users are likely to want, and then surface the determined products and services. Conventional systems may determine these products and services based on a variety of information collected about a user, such as search queries entered (by text, voice, and so on) by the user, web pages to which the user has navigated, content of personal communications (e.g., email, text messages, instant messages, and so on), content posted on the user's social media profile, and so forth. However, such conventional systems fail to consider combinations of products depicted in a user's digital image, e.g., from a single digital image or video. In this way, these conventional techniques fail to account for how users combine products and services acquired into a particular "look and feel." Without considering this "look and feel," conventional systems can surface products and services that do not match the actual tastes of users.

To overcome these problems, complete-the-look techniques are leveraged in a digital medium environment. The complete-the-look techniques are implemented to consider a digital image and identify products and services to surface to a user, e.g., via an e-commerce platform which is then surfaced as AR digital content in a live feed of digital images 114.

As part of this, the complete-the-look techniques are used by a computing device to determine which items are included in a digital image, such as by using one or more object recognition techniques as previously described by the object recognition module 202. By way of example, the complete-the-look techniques as implemented by the computing device 102 determines items in a video captured of a living room, such as couches, lamps, side tables, and so on. The computing device 102 then associates information with the digital image 114 that is indicative of the detected items, e.g., text tags indicative of the detected items. For instance, the computing device 102 associates text tags with the video of the living room that are indicative of the detected items in the living room, e.g., metadata. A catalog of this digital image and associated information can be maintained in a storage device.

From the digital image and the associated information, the camera platform manager module 116 determines common items in the digital image. By way of example, the camera platform manager module 116 determines that rooms having couches, lamps, side tables, and so on, also typically include televisions. Given the determined common items, the camera platform manager module 116 is also able to determine items that are "missing" from digital image corresponding to certain contexts. Assume that the camera platform manager module 116 determines that digital images corresponding to living rooms do typically included couches, lamps, side tables, and televisions. In this scenario, the camera platform manager module 116 receives a digital image 114 from a user of a living room that depicts a couch, lamp, and side table, but not a television. Based on this, the camera platform manager module 116 determines that a television is missing from the living room. To "complete-the-look," the camera platform manager module 116 surfaces televisions listed via one or more listing services to the user using digital content, e.g., as AR digital content 126.

In this context, consider FIG. 11, which depicts example images of a first, second, third, and fourth living room. In this example 1100, the camera platform manager module 116 detects that the images of the first, second, and third living rooms each depict a television—as indicated by the dashed ellipse. These images may be cataloged and maintained in a historical data repository by the camera platform manager module 116, e.g., for comparison to future received images. The fourth living room image may be received by the complete-the-look system in connection with a user. For instance, the user may upload the digital image 114 to the camera platform manager module 116 with a request to process the digital image 114 to determine other items to "complete-the-look" in relation to the living room. Alternately or in addition, the digital image 114 may be scraped from a social media profile of the user, a photo sharing web page of the user, an email of the user, and so forth. In either case, the camera platform manager module 116 determines that the fourth living room image does not depict a television, based on object recognition and comparison of recognized objects to the "common" objects of living rooms. Based on this, the camera platform manager module 116 surfaces the missing items to the user, e.g., through communication with the service manager module 122 of the service provider system 104.

The camera platform manager module 116 may surface determined items in a variety of ways. By way of example, the camera platform manager module 116 can surface a user interface that includes a plurality of listed televisions, which the user can select, e.g., for purchase. Alternately or in addition, the camera platform manager module 116 can surface one or more determined items using augmented and/or virtual reality (AR/VR) techniques as part of a live feed of digital images 114 as described in relation to FIG. 2.

In this context, consider FIGS. 12 and 13. FIGS. 12 and 13 depict example scenarios at 1200, 1300 in which the camera platform manager module 116 leverages AR/VR to surface determined "missing" items for suggestion to a user. In particular, these figures represent scenarios in which a user is standing in the fourth living room with a computing device 102 that captures a live feed of digital images 114 of the fourth living room. In the illustrated examples 1200, 1300, the computing device 102 is shown presenting video content of the fourth living room via a display device 1202. In these examples, however, the computing device 102 is also shown presenting superimposed suggested items in the living room using AR digital content 126.

In the context of FIG. 12, the complete-the-look technique provides data to the computing device 102 so that it can superimpose a television (e.g., the determined missing item) on the living room wall. In the context of FIG. 13, the complete-the-look technique is used to provide data to superimpose framed pictures (e.g., the determined missing items) on the living room wall via the display device 1202.

It is to be appreciated that the complete-the-look techniques are capable of completing looks in a variety of different scenarios without departing from the spirit or scope of the techniques described herein. For instance, the complete-the-look techniques can be used to complete a person's outfit. By way of example, the complete-the-look techniques can be used by the computing device 102 to determine that a person in digital image is wearing a particular type of top and particular bottoms using object recognition techniques. The complete-the-look techniques may also be used to determine that other clothing items or fashion accessories are missing from the outfit based on other digital image depicting persons wearing a similar top and similar bottoms.

It is also to be appreciated that the complete-the-look techniques may determine attributes of items in addition to simply recognizing these items. Rather than simply detect a couch and associate a text tag for "couch" with digital image, for instance, the complete-the-look techniques may be used by the computing device 102 to detect that the couch is a leather couch having a particular style and associate these attributes with the couch. In this way, the complete-the-look techniques as implemented by a computing device can determine particular items that are missing as having certain attributes from other digital images depicting similar styles.

In one or more implementations, the complete-the-look techniques may also consider a location associated with a user (e.g., the physical environment captured by the digital image 114) when determining missing items and items to surface to a user. By way of example, the complete-the-look techniques may be used to surface different items to a user determined to be located in Kansas that are surfaced to a user determined to be located in the Netherlands. In other words, the complete-the-look techniques are used to consider trends (e.g., fashion, interior decorating, toys, and so on) in different locations. The complete-the-look techniques may also be forward looking, such that if trends at a location typically follow trends at a different location (e.g., fashion trends in New York follow fashion trends from Paris a few months later), the complete-the-look techniques can surface items to users in the location based on the trends at the different, followed location.

The complete-the-look techniques can also be leveraged to aid users to navigate through digital catalogs of listed products and services. For instance, the complete-the-look techniques enables a user to take multiple digital images of an item (e.g., an engine block) to determine one or more items in which a user is interested. For instance, the complete-the-look techniques can process the captured digital image to detect which item of an engine block is missing, which item of the engine block can be upgraded, which item of the engine block can be replaced, and so forth.

FIG. 14 depicts a procedure 1400 in an example implementation in which machine-learning techniques and AR digital content are employed as part of missing item determination. To begin in this example, a machine-learning model (e.g., a neural network) is trained by the computing device 102 using a plurality of training digital images. The plurality of training digital images depict physical environments and items disposed in the physical environments (block 1402). Thus, the training digital images depict "good" examples of physical environments and the items (e.g., objects) disposed in those environments. The trained model is then used to implement the missing item techniques described above.

A subsequent digital image 114, for instance, may be received by the camera platform manager module 116 from the digital camera 112 as a "live feed" of digital images of a physical environment (block 1404), such as of the fourth living room of FIG. 13. A determination is then made that an item is missing in the subsequent physical environment based on the subsequent digital image and the trained machine-learning model (block 1406) by the computing device 102. This may be performed locally at the computing device 102 and/or remotely by the service provider system 104.

In response, the camera platform manager module 116 locates AR digital content that corresponds to the item that is missing (block 1408), e.g., as a listing of products or services that are available for sale from the service provider system 104 and represented by the AR digital content. The located AR digital content is then output as part of the live feed of digital images (block 1401) by a corresponding display device 1202 of the computing device 102. In this way, the missing items may be detected and surfaced to a user automatically and without user intervention, thereby improving computational and user efficiency.

Example System and Device

Figure 15:
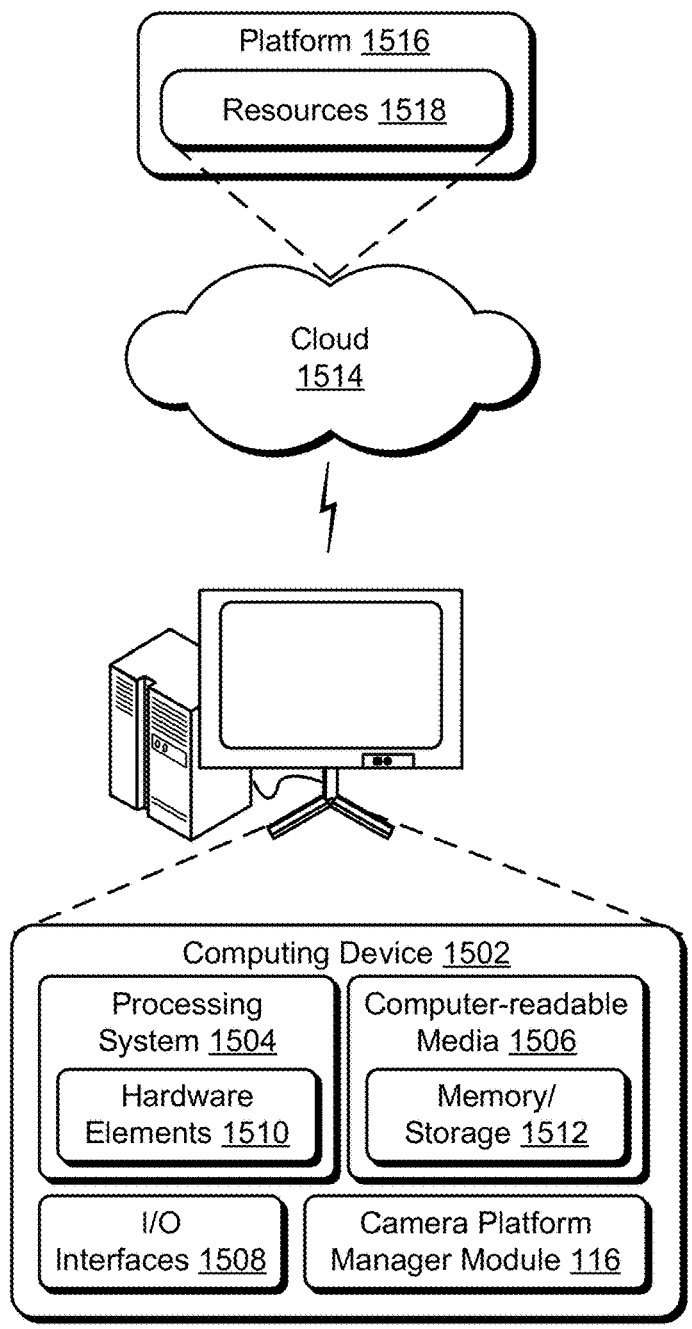
FIG. 15 illustrates an example system including various components of an example device that can be implemented as any type of computing device as described and/or utilize with reference to FIGS. 1-14 to implement embodiments of the techniques described herein.

FIG. 15 illustrates an example system generally at 1500 that includes an example computing device 1502 that is representative of one or more computing systems and/or devices that may implement the various techniques described herein. This is illustrated through inclusion of the camera platform manager module 116. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
   training, by at least one computing device, a machine-learning model with a plurality of digital images that include digital images of similar physical environments to a physical environment;
   obtaining, by at least one computing device and subsequent to training the machine-learning model, a live feed of digital images of the physical environment;
   identifying, by the at least one computing device, at least one item in the physical environment, the at least one item identified from the live feed of digital images using an object recognition technique;
   associating, by the at least one computing device and with the live feed of digital images, information indicative of identified items in the physical environment based on the identifying;
   comparing, by the at least one computing device, the information indicative of the identified items to common items from the digital images of similar physical environments based on the trained machine-learning model;
   determining, by the at least one computing device, which of the identified items in the physical environment correspond to common items based on the trained machine-learning model;
   determining, by the at least one computing device, that at least one common item in the digital images of similar physical environments is missing from the physical environment based on the comparing and the identified items that correspond to common items;
   locating, by the at least one computing device, a listing that corresponds to a missing item in the physical environment; and
   displaying, by the at least one computing device, the listing that corresponds to the missing item as augmented reality on the live feed.

2. The computer-implemented method of claim 1, wherein the listing that corresponds to the missing item is selectable in the augmented reality to purchase the missing item.

3. The computer-implemented method of claim 1, wherein the digital images of similar physical environments are located through tag matching.

4. The computer-implemented method of claim 1, wherein the identifying is performed using the machine-learning model as part of object recognition.

5. The computer-implemented method of claim 1, wherein the at least one item identified is also included as a combination with one or more common items in the digital images of similar physical environments.

6. The computer-implemented method of claim 1, wherein the identifying is based at least in part on a location associated with the physical environment.

7. The computer-implemented method of claim 1, wherein the augmented reality includes digital marketing content configured to cause conversion of a product or service.

8. A computing device comprising:
   a digital camera configured to capture a live feed of digital images of a physical environment;
   a display device;
   a processing system; and
   a computer-readable storage medium storing instructions that, responsive to execution by the processing system, cause the processing system to perform operations comprising:
   training a machine-learning model with a plurality of digital images that include digital images of similar physical environments to the physical environment, the live feed of digital images captured subsequent to training the machine-learning model;

identifying at least one item in the physical environment, the at least one item identified from the live feed of digital images using an object recognition technique;

associating, with the live feed of digital images, information indicative of identified items in the physical environment based on the identifying;

comparing the information indicative of the identified items to common items from the digital images of similar physical environments based on the trained machine-learning model;

determining which of the identified items in the physical environment correspond to common items based on the trained machine-learning model;

determining that at least one common item in the digital images of similar physical environments is missing from the physical environment based on the comparing and the identified items that correspond to common items;

locating a listing that corresponds to a missing item in the physical environment; and displaying the listing that corresponds to the missing item as augmented reality on the live feed.

9. The computing device of claim 8, wherein the listing that corresponds to the missing item is selectable in the augmented reality to purchase the missing item.

10. The computing device of claim 8, wherein the digital images of similar physical environments are located through tag matching.

11. The computing device of claim 8, wherein the identifying is performed using the machine-learning model as part of object recognition.

12. The computing device of claim 8, wherein the at least one item identified is also included as a combination with one or more common items in the digital images of similar physical environments.

13. The computing device of claim 8, wherein the identifying is based at least in part on a location associated with the physical environment.

14. A computer-implemented method comprising:

training, by at least one computing device, a machine-learning model using a plurality of digital images depicting physical environments and items disposed in the physical environments;

receiving, by the at least one computing device, an additional digital image subsequent to training the machine-learning model, the additional digital image being included in a live feed of digital images capturing a physical environment;

determining, by the at least one computing device, that at least one common item in the digital images of similar physical environments to the physical environment is missing from the physical environment based on the additional digital image and the trained machine-learning model;

locating, by the at least one computing device, augmented reality digital content that corresponds to a missing item in the physical environment; and outputting, by the at least one computing device, the located augmented reality digital content as part of the live feed of digital images.

15. The computer-implemented method of claim 14, wherein the located augmented reality digital content is selectable to purchase the missing item.

16. The computer-implemented method of claim 14, wherein the plurality of digital images are training digital images.

17. The computer-implemented method of claim 14, wherein the located augmented reality digital content is a listing.

18. The computer-implemented method of claim 14, wherein the missing item is a replacement item.

19. The computer-implemented method of claim 1, wherein determining that the at least one common item in the digital images of similar physical environments is missing from the physical environment is based on the trained machine-learning model and the live feed of digital images of the physical environment.

20. The computing device of claim 8, wherein the computing device is a mobile phone.

* * * * *